US012665778B1

(12) United States Patent
Forster

(10) Patent No.: US 12,665,778 B1
(45) Date of Patent: Jun. 23, 2026

(54) DISTRIBUTED CRYPTOGRAPHIC CONSENSUS-BASED ARCHITECTURE FOR STATE SYNCHRONIZATION USING REDUNDANT VERIFICATION AND DETERMINISTIC VALIDATORS

(71) Applicant: Domus Tower, Inc., New York, NY (US)

(72) Inventor: Joseph Burke Forster, San Francisco, CA (US)

(73) Assignee: Domus Tower, Inc., New York, NY (US)

( * ) Notice: Subject to any disclaimer, the term of this patent is extended or adjusted under 35 U.S.C. 154(b) by 0 days.

(21) Appl. No.: 19/282,115

(22) Filed: Jul. 28, 2025

Related U.S. Application Data

(63) Continuation-in-part of application No. 17/656,608, filed on Mar. 25, 2022, which is a continuation of
(Continued)

(51) Int. Cl.
*H04L 9/00* (2022.01)
*H04L 9/32* (2006.01)

(52) U.S. Cl.
CPC .............. *H04L 9/50* (2022.05); *H04L 9/3297* (2013.01); *H04L 2209/463* (2013.01); *H04L 2209/56* (2013.01)

(58) Field of Classification Search
USPC ......................................................... 380/28
See application file for complete search history.

(56) References Cited

U.S. PATENT DOCUMENTS

| 5,671,358 | A | 9/1997 | Debe et al. |
| 5,677,955 | A | 10/1997 | Doggett et al. |

(Continued)

FOREIGN PATENT DOCUMENTS

WO WO-2018196969 A1 * 11/2018 .......... G06F 11/3495

OTHER PUBLICATIONS

Voulgaris et al, hereinafter ("Voulgaris"), "Blockchain Technology for Intelligent Environments," Department of Informatics, Athens University of Economics and Business, Oct. 11, 2019, pp. 1-24 (Year: 2019).*

(Continued)

*Primary Examiner* — Sakinah White-Taylor
(74) *Attorney, Agent, or Firm* — Perkins Coie LLP; Andrew T. Pettit

(57) ABSTRACT

A computer-implemented system for cryptographically authenticated state synchronization within a distributed ledger uses a digital synchronization agent to irrevocably and synchronously transfer digital security positions and corresponding digital fiat instruments between digital instrument containers. A deterministic supervisory verification framework redundantly executes verification of transfer requests using a quorum of nodes, distributing trust across the network. The system generates priority timestamps using a deterministic consensus protocol that excludes mining operations, proof-of-work operations, and probabilistic finality mechanisms. The system appends the priority timestamps to transfer operations based on consensus, generating immutable execution paths with sub-threshold latency. The system synchronizes digital security position states in real-time with digital fiat instrument states, preventing deferred state synchronization.

20 Claims, 24 Drawing Sheets

Related U.S. Application Data application No. 16/277,976, filed on Feb. 15, 2019, now Pat. No. 11,455,685, which is a continuation of application No. 15/467,727, filed on Mar. 23, 2017, now Pat. No. 11,410,233, which is a continuation of application No. 14/838,290, filed on Aug. 27, 2015, now abandoned, and a continuation-in-part of application No. 15/078,768, filed on Mar. 23, 2016, now Pat. No. 10,515,409.

(60) Provisional application No. 62/312,376, filed on Mar. 23, 2016, provisional application No. 62/154,001, filed on Apr. 28, 2015.

(56) References Cited

U.S. PATENT DOCUMENTS

| | | | |
|---|---|---|---|
| 5,748,738 | A | 5/1998 | Bisbee et al. |
| 5,758,097 | A | 5/1998 | Debe et al. |
| 5,774,553 | A | 6/1998 | Rosen |
| 5,839,119 | A | 11/1998 | Krsul et al. |
| 5,978,779 | A | 11/1999 | Stein et al. |
| 6,029,146 | A | 2/2000 | Hawkins et al. |
| 6,237,096 | B1 | 5/2001 | Bisbee et al. |
| 6,247,000 | B1 | 6/2001 | Hawkins et al. |
| 6,321,212 | B1 | 11/2001 | Lange |
| 6,434,238 | B1 | 8/2002 | Chaum et al. |
| 7,127,421 | B1 | 10/2006 | Beacham et al. |
| 7,444,300 | B1 | 10/2008 | Broms et al. |
| 7,567,909 | B1 | 7/2009 | Billingsley |
| 9,672,499 | B2 | 6/2017 | Yang et al. |
| 9,892,460 | B1 | 2/2018 | Winklevoss et al. |
| 10,068,228 | B1 | 9/2018 | Winklevoss et al. |
| 10,192,268 | B2 | 1/2019 | Booth |
| 10,269,009 | B1 | 4/2019 | Winklevoss et al. |
| 10,515,409 | B2 | 12/2019 | Creighton et al. |
| 11,410,233 | B2 | 8/2022 | Creighton et al. |
| 11,785,080 | B1* | 10/2023 | Kaddoura .......... H04L 67/1076 |
| | | | 370/229 |
| 11,824,990 | B2* | 11/2023 | Youssef ................ H04L 9/3247 |
| 2002/0032642 | A1 | 3/2002 | Chichilnisky |
| 2002/0035531 | A1 | 3/2002 | Push |
| 2002/0128929 | A1 | 9/2002 | Urabe |
| 2002/0133383 | A1 | 9/2002 | Chao et al. |
| 2002/0156726 | A1 | 10/2002 | Kleckner et al. |
| 2002/0174066 | A1 | 11/2002 | Kleckner et al. |
| 2003/0130958 | A1 | 7/2003 | Narayanan et al. |
| 2003/0158798 | A1 | 8/2003 | Green |
| 2003/0220869 | A1 | 11/2003 | Colle et al. |
| 2004/0083159 | A1 | 4/2004 | Crosby et al. |
| 2004/0128223 | A1 | 7/2004 | Kuhn et al. |
| 2005/0010613 | A1 | 1/2005 | Lejdstrom et al. |
| 2005/0102220 | A1 | 5/2005 | Stackpole |
| 2005/0171892 | A1 | 8/2005 | Naas et al. |
| 2005/0192888 | A1 | 9/2005 | Lennane et al. |
| 2005/0283422 | A1 | 12/2005 | Myr |
| 2006/0059066 | A1 | 3/2006 | Glinberg et al. |
| 2006/0069066 | A1 | 3/2006 | Eldar-Finkelman et al. |
| 2006/0106708 | A1 | 5/2006 | Abushaban et al. |
| 2006/0186193 | A1 | 8/2006 | Nelson et al. |
| 2006/0224494 | A1 | 10/2006 | Pinkava |
| 2007/0198376 | A1 | 8/2007 | Zhu et al. |
| 2007/0233615 | A1 | 10/2007 | Tumminaro |
| 2007/0250426 | A1 | 10/2007 | Demirjian |
| 2007/0250437 | A1 | 10/2007 | Lejdstrom et al. |
| 2007/0282734 | A1 | 12/2007 | Huntley et al. |
| 2007/0294183 | A1 | 12/2007 | Camenisch et al. |
| 2008/0052215 | A1 | 2/2008 | Tudisco |
| 2008/0281750 | A1 | 11/2008 | Toffey et al. |
| 2009/0043637 | A1 | 2/2009 | Eder |
| 2009/0055250 | A1 | 2/2009 | Skuriat et al. |
| 2009/0070268 | A1 | 3/2009 | Sarkissian et al. |
| 2009/0119190 | A1 | 5/2009 | Realini |
| 2009/0157501 | A1 | 6/2009 | Martel et al. |
| 2009/0164386 | A1 | 6/2009 | Greenfield et al. |
| 2009/0177591 | A1 | 7/2009 | Thorpe et al. |
| 2009/0240616 | A1 | 9/2009 | Hammer et al. |
| 2010/0005022 | A1 | 1/2010 | Depetris et al. |
| 2010/0005030 | A1 | 1/2010 | Depetris et al. |
| 2010/0185531 | A1 | 7/2010 | Van Luchene |
| 2011/0071958 | A1 | 3/2011 | Grody et al. |
| 2011/0145789 | A1 | 6/2011 | Rasch et al. |
| 2012/0066688 | A1 | 3/2012 | Chiang et al. |
| 2012/0078772 | A1 | 3/2012 | Booth |
| 2012/0185373 | A1* | 7/2012 | Grody .................... G06Q 40/04 |
| | | | 705/37 |
| 2012/0284155 | A1 | 11/2012 | Holten et al. |
| 2012/0296792 | A1 | 11/2012 | Levoff et al. |
| 2013/0030963 | A1 | 1/2013 | Cramer et al. |
| 2013/0073436 | A1 | 3/2013 | Luk et al. |
| 2013/0073520 | A1 | 3/2013 | Ng et al. |
| 2013/0218739 | A1 | 8/2013 | Kmiec et al. |
| 2013/0226827 | A1 | 8/2013 | Stevens |
| 2014/0114832 | A1 | 4/2014 | Escott |
| 2014/0172663 | A1 | 6/2014 | Kronwall et al. |
| 2014/0188675 | A1 | 7/2014 | Brown et al. |
| 2014/0229351 | A1 | 8/2014 | Lutnick et al. |
| 2014/0258071 | A1 | 9/2014 | Tilly et al. |
| 2014/0297504 | A1 | 10/2014 | Bergenudd et al. |
| 2014/0315536 | A1 | 10/2014 | Chow et al. |
| 2015/0026072 | A1 | 1/2015 | Zhou et al. |
| 2015/0066732 | A1 | 3/2015 | Escott |
| 2015/0074415 | A1 | 3/2015 | Tanner et al. |
| 2015/0081566 | A1 | 3/2015 | Slepinin |
| 2015/0106250 | A1 | 4/2015 | Deel-Smith |
| 2015/0106255 | A1 | 4/2015 | Labuszewski et al. |
| 2015/0120567 | A1 | 4/2015 | Van Rooyen et al. |
| 2015/0127515 | A1 | 5/2015 | Studnitzer et al. |
| 2015/0127516 | A1 | 5/2015 | Studnitzer et al. |
| 2015/0142670 | A1 | 5/2015 | Zloth et al. |
| 2015/0161727 | A1 | 6/2015 | Callaway et al. |
| 2015/0206106 | A1 | 7/2015 | Yago |
| 2015/0220928 | A1 | 8/2015 | Allen |
| 2015/0244690 | A1 | 8/2015 | Mossbarger |
| 2015/0254272 | A1 | 9/2015 | Regni et al. |
| 2015/0262137 | A1 | 9/2015 | Armstrong |
| 2015/0262176 | A1 | 9/2015 | Langschaedel et al. |
| 2015/0269675 | A1 | 9/2015 | Walker |
| 2015/0278820 | A1 | 10/2015 | Meadows |
| 2015/0286645 | A1 | 10/2015 | Sinha et al. |
| 2015/0287026 | A1 | 10/2015 | Yang et al. |
| 2015/0332224 | A1 | 11/2015 | Melika et al. |
| 2015/0332395 | A1 | 11/2015 | Walker et al. |
| 2015/0356555 | A1 | 12/2015 | Pennanen |
| 2016/0042468 | A1 | 2/2016 | Shaaban et al. |
| 2016/0077920 | A1 | 3/2016 | Regni et al. |
| 2016/0086267 | A1 | 3/2016 | Labuszewski et al. |
| 2016/0086268 | A1 | 3/2016 | Labuszewski et al. |
| 2016/0092984 | A1 | 3/2016 | Shontz et al. |
| 2016/0092985 | A1 | 3/2016 | Shontz et al. |
| 2016/0092988 | A1 | 3/2016 | Letourneau |
| 2016/0162897 | A1 | 6/2016 | Feeney |
| 2016/0246802 | A1 | 8/2016 | Regni et al. |
| 2016/0260169 | A1 | 9/2016 | Arnold et al. |
| 2016/0269182 | A1 | 9/2016 | Sriram et al. |
| 2016/0283941 | A1 | 9/2016 | Andrade |
| 2016/0292786 | A1 | 10/2016 | Khizhnyak et al. |
| 2016/0300223 | A1 | 10/2016 | Grey et al. |
| 2016/0321751 | A1 | 11/2016 | Creighton, IV et al. |
| 2017/0178237 | A1 | 6/2017 | Wong |
| 2017/0228705 | A1 | 8/2017 | Sandor et al. |
| 2017/0228822 | A1 | 8/2017 | Creighton, IV et al. |
| 2017/0278081 | A1 | 9/2017 | Walker et al. |
| 2017/0300812 | A1 | 10/2017 | Ohsawa |
| 2017/0300912 | A1 | 10/2017 | Narasimhan et al. |
| 2017/0338967 | A1 | 11/2017 | Lewison et al. |
| 2018/0240107 | A1 | 8/2018 | Andrade |
| 2018/0341930 | A1 | 11/2018 | Moir et al. |

(56) References Cited

U.S. PATENT DOCUMENTS

2020/0162251 A1 *   5/2020   Wentz ................. G06F 21/6218
2025/0292253 A1 *   9/2025   Gilchrist .............. G06F 3/0604

OTHER PUBLICATIONS

De Villiers et al "A Three-Tier Framework for Understanding Disruption Trajectories for Blockchain in the Electricity Industry," IEEE Access, School of Electrical and Electronics Engineering, University College Dublin, Dublin 4, D04 V1 W8 Ireland, vol. 8, pp. 65670-65682 (Year: 2020).*

Apache Storm, [online], Apache Software Foundation, [retrieved on Sep. 1, 2018]. Retrieved from the Internet: <URL: https://storm.apache.org/>., 2014, pp. 1-2.

Hyperledger / Hyperledger-Server, [online], GibHub, Inc, [retrieved on Sep. 1, 2018]. Retrieved from the Internet: <URL: https://github.com/hyperledger/hyperledger-server>., 2015, pp. 1-3.

Nakamoto, Satoshi, "Bitcoin: A Peer-to-Peer Electronic Cash System", satoshin@gmx.com; www.bitcoin.org; Oct. 31, 2008, 9 pages.

* cited by examiner

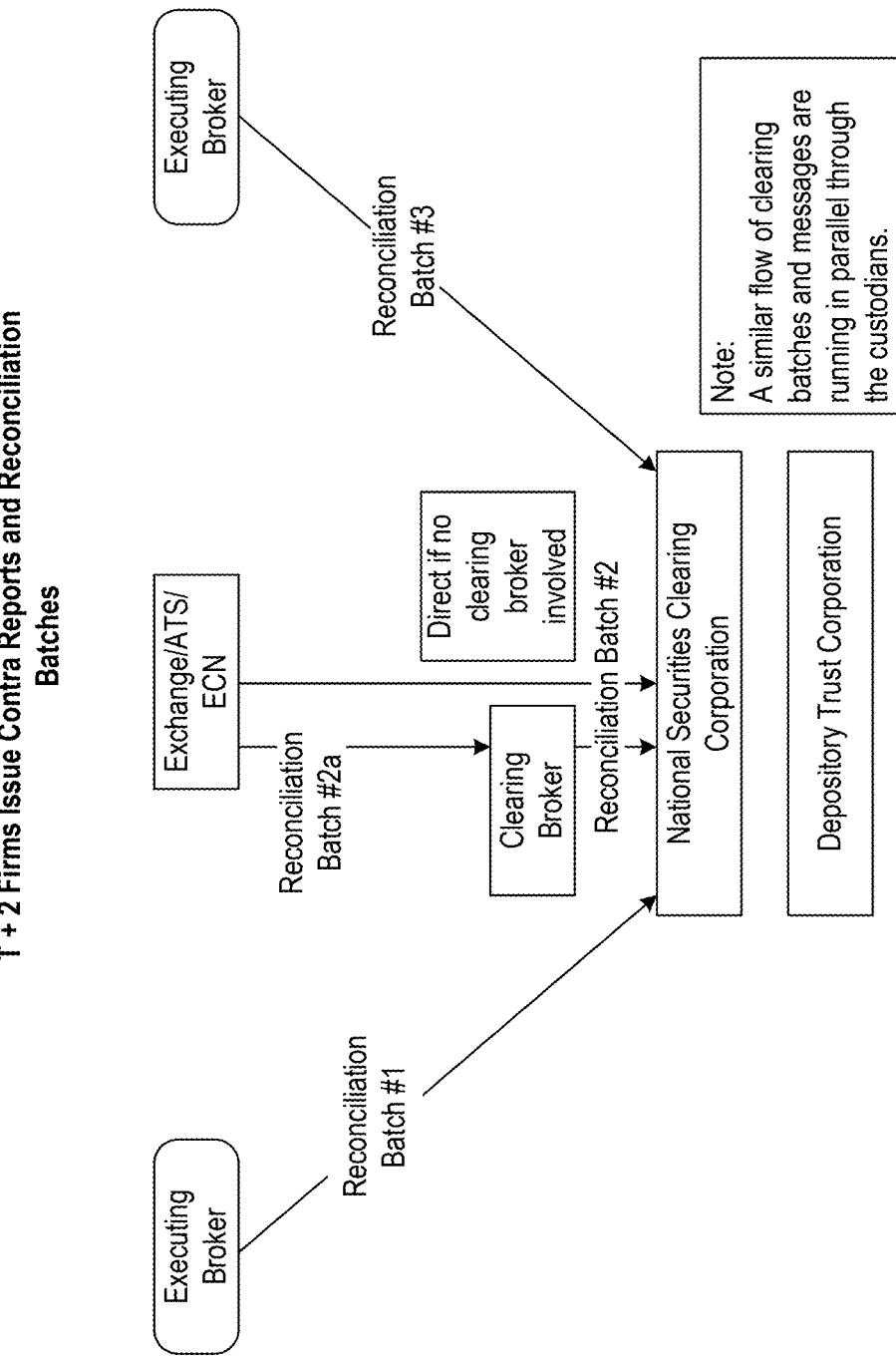

T + 2 Firms Issue Contra Reports and Reconciliation Batches

Executing Broker

Executing Broker

Exchange/ATS/ECN

Direct if no clearing broker involved

Reconciliation Batch #2a

Clearing Broker

Reconciliation Batch #2

Reconciliation Batch #3

Reconciliation Batch #1

National Securities Clearing Corporation

Depository Trust Corporation

Note:
A similar flow of clearing batches and messages are running in parallel through the custodians.

*FIG. 3*

Figure 4:
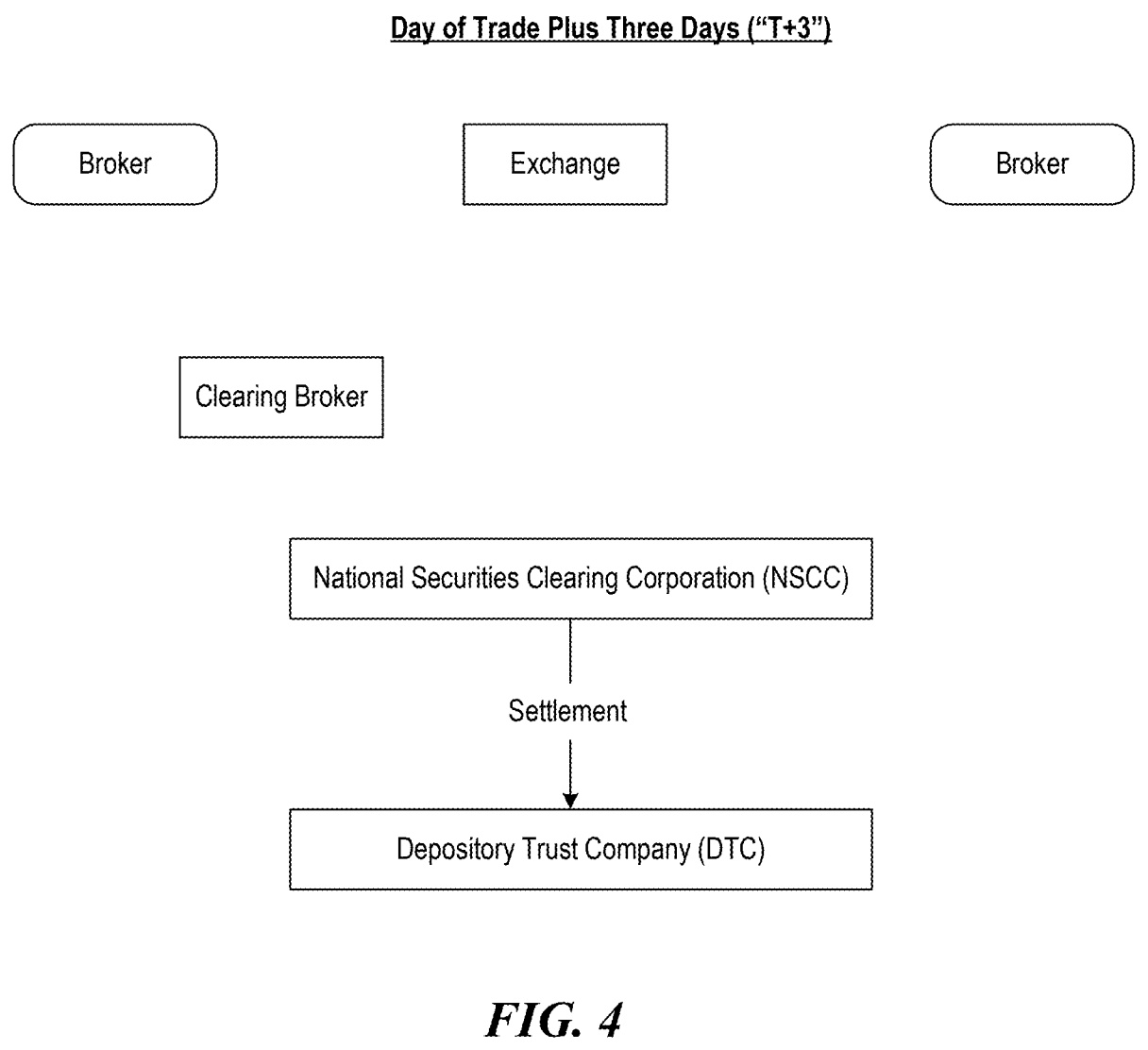

Day of Trade Plus Three Days ("T+3")

Broker

Exchange

Broker

Clearing Broker

National Securities Clearing Corporation (NSCC)

Settlement

Depository Trust Company (DTC)

Figure 23:
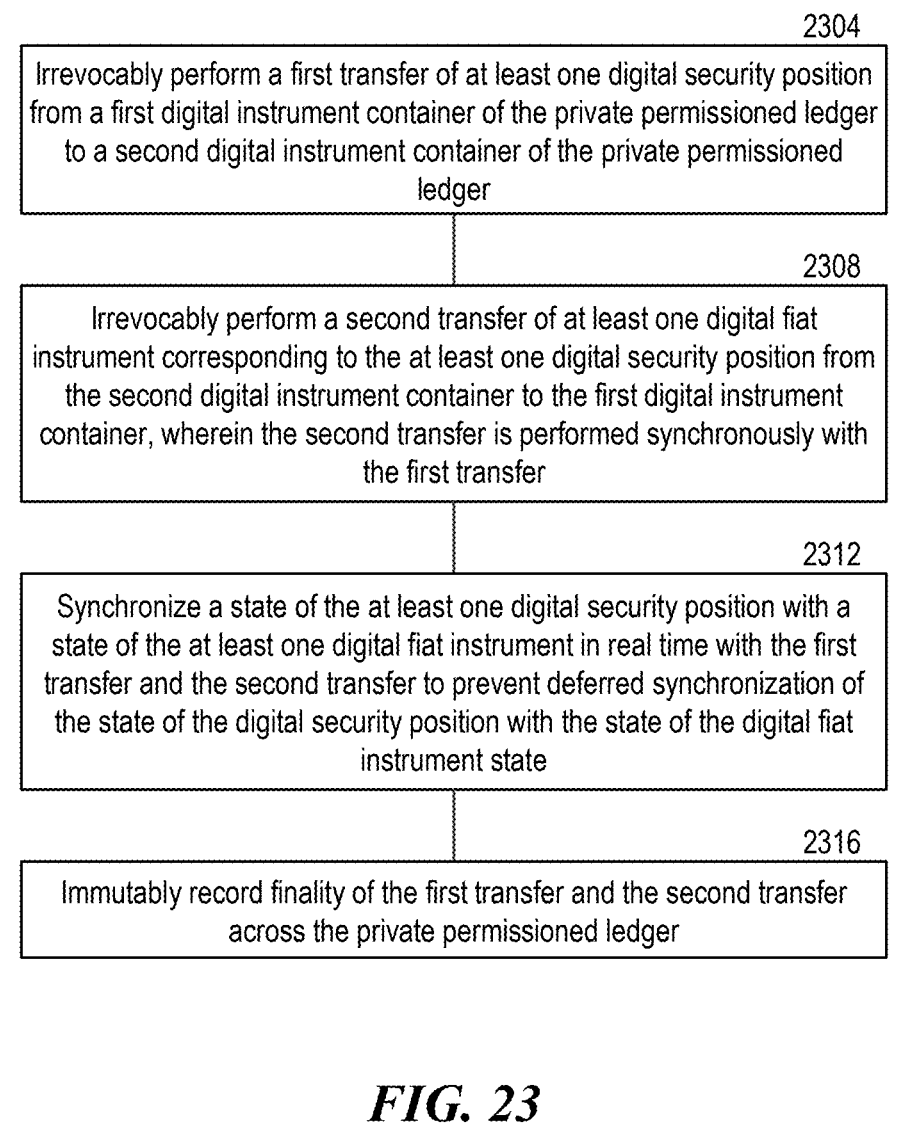

Irrevocably perform a first transfer of at least one digital security position from a first digital instrument container of the private permissioned ledger to a second digital instrument container of the private permissioned ledger

2308

Irrevocably perform a second transfer of at least one digital fiat instrument corresponding to the at least one digital security position from the second digital instrument container to the first digital instrument container, wherein the second transfer is performed synchronously with the first transfer

2312

Synchronize a state of the at least one digital security position with a state of the at least one digital fiat instrument in real time with the first transfer and the second transfer to prevent deferred synchronization of the state of the digital security position with the state of the digital fiat instrument state

2316

Immutably record finality of the first transfer and the second transfer across the private permissioned ledger

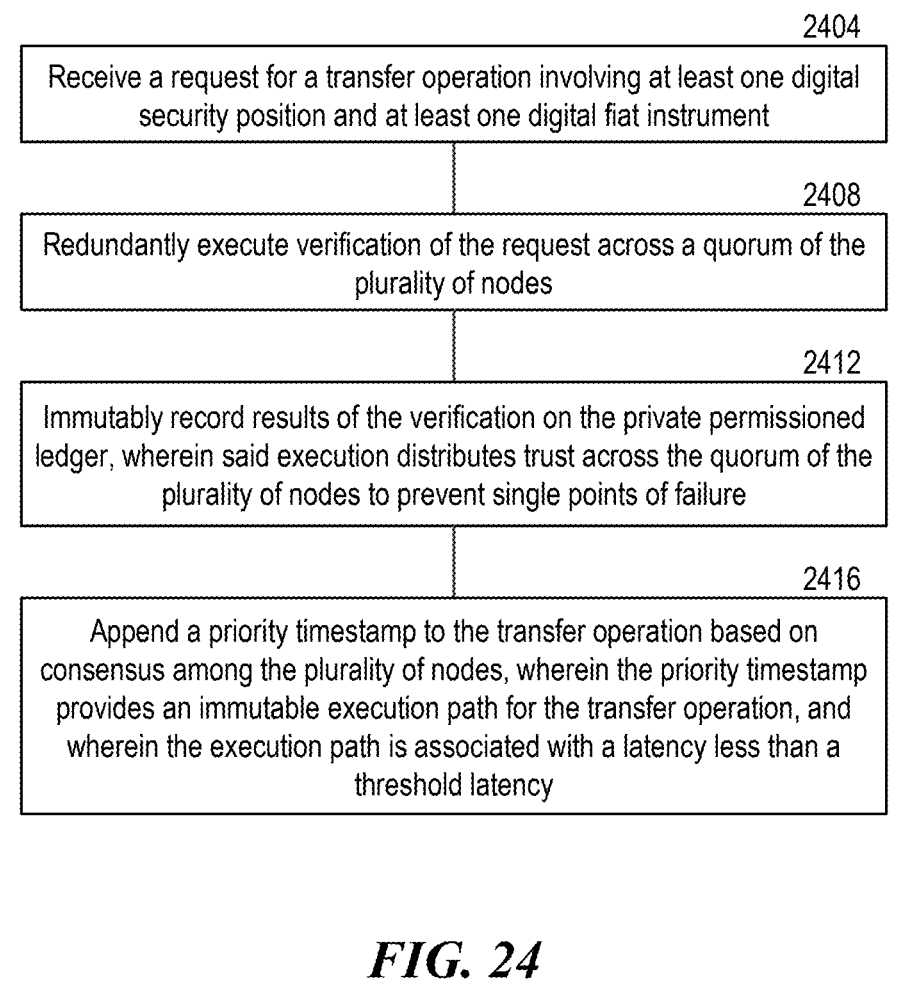

Receive a request for a transfer operation involving at least one digital security position and at least one digital fiat instrument

2408

Redundantly execute verification of the request across a quorum of the plurality of nodes

2412

Immutably record results of the verification on the private permissioned ledger, wherein said execution distributes trust across the quorum of the plurality of nodes to prevent single points of failure

2416

Append a priority timestamp to the transfer operation based on consensus among the plurality of nodes, wherein the priority timestamp provides an immutable execution path for the transfer operation, and wherein the execution path is associated with a latency less than a threshold latency

*FIG. 24*

DISTRIBUTED CRYPTOGRAPHIC CONSENSUS-BASED ARCHITECTURE FOR STATE SYNCHRONIZATION USING REDUNDANT VERIFICATION AND DETERMINISTIC VALIDATORS

CROSS-REFERENCE TO RELATED APPLICATIONS

This application is a continuation-in-part of U.S. application Ser. No. 17/656,608, entitled "SETTLEMENT OF SECURITIES TRADES USING APPEND ONLY LEDGERS" filed Mar. 25, 2022, which is a continuation of U.S. patent application Ser. No. 16/277,976, entitled "SETTLEMENT OF SECURITIES TRADES USING APPEND ONLY LEDGERS" filed Feb. 15, 2019, now U.S. Pat. No. 11,455,685, which is a continuation application of U.S. patent application Ser. No. 15/467,727, entitled "BLOCK-CHAIN TECHNOLOGY TO SETTLE TRANSACTIONS" and filed Mar. 23, 2017, now U.S. Pat. No. 11,410,233, which claims priority to U.S. Provisional Application No. 62/312,376, entitled "BLOCKCHAIN TECHNOLOGY TO SETTLE US EQUITIES" and filed Mar. 23, 2016. U.S. patent application Ser. No. 15/467,727 is a continuation application of U.S. patent application Ser. No. 14/838,290, entitled "REAL-TIME SETTLEMENT OF SECURITIES TRADES OVER APPEND-ONLY LEDGERS" and filed Aug. 27, 2015, which claims priority to U.S. Provisional Application No. 62/154,001, entitled "SYSTEMS AND METHODS FOR SETTLING TRADES" and filed Apr. 28, 2015, and U.S. patent application Ser. No. 15/467,727 is also a continuation application U.S. patent application Ser. No. 15/078,768, entitled "DISTRIBUTING WORK LOAD OF HIGH-VOLUME PER SECOND TRANSACTIONS RECORDED TO APPEND-ONLY LEDGERS" and filed Mar. 23, 2016, now U.S. Pat. No. 10,515,409, which also claims priority to U.S. Provisional Application No. 62/154,001 entitled "SYSTEMS AND METHODS FOR SETTLING TRADES" and filed Apr. 28, 2015. The applications listed above are all incorporated by reference in their entirety.

TECHNICAL FIELD

Various embodiments concern the clearing and state synchronization or settlement process of digital security positions or tokenized securities, such as exchange-traded securities. More specifically, various embodiments relate to systems and methods that enable real-time gross state synchronization or settlement of executed transfer operations or trades.

BACKGROUND

When transfers of digital security positions are executed on a major exchange, a digital security position (or security) goes through a state synchronization (or settlement) process whereby the digital security position is delivered, typically in exchange for digital fiat instruments (or money). However, the traditional settlement process is costly, time consuming, and error prone. For example, in the United States, the settlement date for marketable stocks is usually three business days after the trade is executed. But a number of risks can arise during the settlement interval and, in addition to being time-consuming, some trades are ultimately disputed and never settled. These failed transactions are costly to the financial industry.

SUMMARY

Various embodiments described herein hasten the process by which securities are bought, sold, and delivered ("the settlement process") by using cryptographic hashes. That is, various embodiments enable real-time, or near real-time, gross settlement of trades.

Brokers or traders first include cryptographically signed instructions with their order. The cryptography structure may be based on public and private keys that identify individual brokers and traders. An exchange, which is an organized market for trading securities, commodities, etc., processes the trades and generates a trade report that summarizes the transaction. In some embodiments, clearing instructions are then processed and sent to one or more appropriate clearing brokers. The trade report and cryptographically signed instructions can be bundled into a permissioned, distributed cryptographic ledger which is an electronic record of the transaction.

An unlimited number of side ledgers, which represent a subset of global trade asset ownership and orders, can be created from a single primary ledger distributed to a plurality of nodes. Each data block in the primary ledger contains a unique cryptographic hash. The hashes can be made available to all authorized parties (e.g., brokers, traders, custodians, exchanges) and can be used to provide an audit of settlement (i.e., a summary of transactions).

Because transactions can be verified by the cryptographic signatures, the period of time traditionally needed by brokers, traders, etc., to review and dispute order information is no longer necessary. A matching (i.e., validated) signature guarantees that a particular broker generated and authorized the trade.

BRIEF DESCRIPTION OF THE DRAWINGS

FIG. 3 is an equity exchange and settlement process as may traditionally occur two business days after the trade date ("T+2").

FIG. 4 is an equity exchange and settlement process as may traditionally occur three business days after the trade date ("T+3").

FIG. 23 is a flow diagram illustrating a process for distributed cryptographic consensus-based state synchronization.

FIG. 24 is a flow diagram illustrating a process for operating a deterministic supervisory verification framework using redundant verification and deterministic validators.

DETAILED DESCRIPTION

Figure 1:
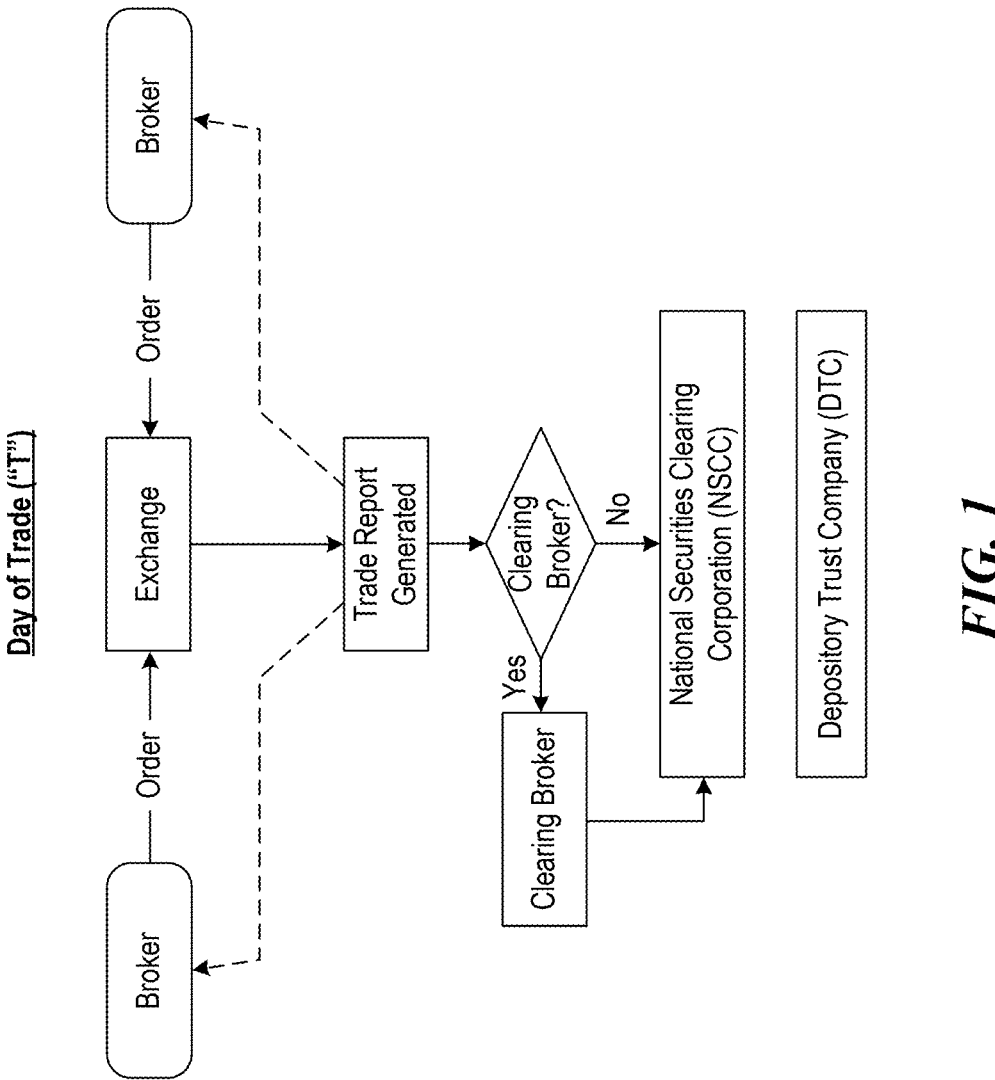
FIG. 1 illustrates an equity exchange and settlement process as may traditionally occur on the trade date ("T").

Many existing digital security position transfer and state synchronization systems rely on multi-day synchronization cycles that can introduce risks and inefficiencies into financial markets. These systems often require trades to go through a series of intermediate systems and state synchronization steps before final settlement occurs, typically three business days after the trade date. During this settlement period, counterparty risk exists as either party could potentially default on their obligations. Additionally, the extended settlement timeframe ties up capital and creates operational complexities for market participants.

Some systems attempt to address these issues by using distributed ledger technology, but face challenges in achieving the transaction throughput required for high-volume securities markets. For example, public blockchain networks that use proof-of-work consensus mechanisms can process only a limited number of transactions per second, making them unsuitable for securities settlement without significant modifications. Other private blockchain implementations struggle to balance decentralization, scalability and security in a way that meets regulatory requirements for critical financial market infrastructure.

There is a need for systems that can enable near real-time gross settlement of securities trades while maintaining the benefits of cryptographic verification and immutable transaction records. Such systems must be able to handle extremely high transaction volumes, provide mechanisms for regulatory oversight, and integrate with existing market practices and infrastructure. At the same time, they need to offer stronger security guarantees and more efficient settlement processes compared to traditional centralized systems. Achieving these goals requires novel approaches to distributed system architecture, consensus protocols, and cryptographic techniques tailored for regulated financial markets.

The disclosed technology provides a novel approach to securities settlement using a distributed ledger with a deterministic supervisory verification framework. This system enables near real-time gross settlement of trades by implementing a digital state synchronization agent that can irrevocably and synchronously transfer digital security positions or tokenized securities and corresponding digital fiat instruments between digital instrument containers or token wallets. The framework utilizes a quorum of nodes to redundantly execute verification of transfer requests, distributing trust across the network and eliminating single points of failure. A key feature is the appending of priority timestamps to transfer operations based on consensus among nodes, which creates an immutable execution path with latency below a specified threshold.

This technology addresses several challenges faced by existing settlement systems. By synchronizing the state of digital security positions with digital fiat instruments in real time, it prevents deferred state synchronization and reduces counterparty risk. The system's ability to handle high transaction volumes is achieved through a scalable architecture that shards incoming transactions across multiple block makers, with separate processes for transaction blocks and metadata blocks. This approach allows for parallel processing while maintaining cryptographic linkages between blocks, enabling the system to scale to millions of transactions per second.

The disclosed systems offers significant advantages over many existing state synchronization technologies. The systems address the technological problem of achieving high-throughput, real-time state synchronization of digital security positions while maintaining data integrity. Traditional state synchronization systems often rely on multi-day cycles and centralized operations, which introduce latency and operational inefficiencies. The disclosed distributed ledger architecture uses a deterministic supervisory verification framework to enable synchronous, irrevocable transfers of digital security positions and corresponding digital fiat instruments. This technological solution overcomes the scalability limitations of public ledger networks and centralized databases by implementing a distributed ledger with redundant execution of transfer request verifications across a quorum of nodes.

The technological solution provides practical applications by real-time state synchronization of digital security positions with cryptographic certainty. The system's ability to append priority timestamps to transfer operations based on consensus among nodes of the ledger generates an immutable execution path with latency below specified thresholds. This enables the simultaneous final transfer of digital security positions and digital fiat instruments, eliminating deferred state synchronization. The practical implementation includes integration with existing infrastructure through application programming interfaces (APIs) that ingest external instructions and state synchronization messages, enabling interoperability with tokenized platforms and real-time digital instrument transfer systems.

The technological solution improves the functioning of a distributed ledger by introducing a deterministic consensus protocol that excludes energy-intensive mining operations, proof-of-work mechanisms, and probabilistic finality models. This approach enhances the efficiency and speed of transaction processing while maintaining security. The system's worker/supervisor model acts as a deterministic and auditable trust layer, distributing verification across multiple nodes to eliminate single points of failure. By synchronizing the state of digital security positions with digital fiat instruments in real-time, the system prevents deferred state synchronization and reduces operational complexity. These improvements enable the distributed ledger to handle high transaction volumes with lower latency and greater energy efficiency compared to traditional blockchain implementations, while still providing immutability and cryptographic verifiability.

Terminology

As used herein, the term "node" refers to a contributor on a distributed network. The node exists on a computer or a server. The physical device is referred to a node in as much as the physical device is programmed to contribute to the network. The word "node" can additionally refer to the programming or software on the physical device that causes the device to know which other devices to communicate with and contribute with the network.

As used herein, the terms "immutable" or "append-only" with reference to ledgers mean that once data has been entered into the ledger, that data is not changed. To repair errors on the ledger new data is added which reverses the erroneous data. Despite that data may not be changed, over time, the ledger may be truncated or archived.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

When used in reference to a list of multiple items, the word "or" is intended to cover all of the following interpretations: any of the items in the list, all of the items in the list, and any combination of items in the list.

As used herein, the terms "tokenized securities" and "digital security positions" may refer to cryptographically-secured data structures representing ownership rights or obligations, stored and managed within a distributed ledger system. These positions are uniquely identified by cryptographic hashes, can be atomically transferred between digital instrument containers, and are subject to programmatically enforced rules governing their issuance, transfer, and redemption within the system's consensus protocol.

As used herein, the terms "cash" and "digital fiat instruments" may refer to cryptographically-verifiable representations of central bank-issued currency within a distributed ledger system. These instruments are implemented as smart contracts with predefined transfer rules, maintain a fixed nominal value relative to their corresponding fiat currency, and can be atomically exchanged for digital security positions or other digital assets within the system's consensus protocol.

As used herein, the terms "token wallet," "account," and "digital instrument container" may refer to a cryptographically-secured data structure within a distributed ledger system that encapsulates and manages digital security positions and digital fiat instruments. It implements access control mechanisms, maintains a verifiable transaction history, and interacts with smart contracts to execute transfers, while ensuring atomicity and consistency across the network through consensus protocols.

As used herein, the terms "settlement" and "state synchronization" may refer to the cryptographically-authenticated process of simultaneously updating multiple distributed ledgers to reflect the transfer of digital security positions and digital fiat instruments between system participants. This process ensures consistency across all nodes, creates an immutable record of transactions, and provides finality through a deterministic consensus mechanism without relying on probabilistic confirmation methods.

As used herein, the term "digital instrument transfer" may refer to the cryptographically-secured process of moving digital fiat instruments between digital instrument containers within a distributed ledger system. This transfer is executed atomically, verified by a quorum of system nodes, and recorded with an appended priority timestamp to ensure an immutable and auditable execution path.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, and special significance is not to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Overview of State Synchronization Process for Digital Security Positions

FIG. 1 illustrates an equity exchange and settlement process as may traditionally occur on the trade date ("T"). Traditional trade settlement processes using in by the financial industry can take up to three days to complete, as illustrated by FIGS. 1-4. FIG. 1 illustrates what occurs on the day of the trade (also referred to as "T"). Brokers, also referred to as buyers and sellers (e.g., of equities), can agree to an exchange. For example, brokers may agree to exchange equity (e.g., stock) in a particular company for cash. Once an exchange has been agreed to, a trade report is generated.

In some instances, the trade report is sent to a clearing broker or clearing house that acts as a liaison between the broker(s) and a clearing corporation. The clearing broker ensures the trade is settled appropriately and the transaction is successful. The trade report can then be transmitted by the clearing house to the National Securities Clearing Corporation (NSCC). In some instances, the trade report is sent directly to the NSCC (i.e., no clearing house involved). The NSCC provides clearance, settlement, and information services for the equities. Moreover, the NSCC offers multilateral netting such that brokers can offset buy and sell positions into a single payment obligation.

Figure 2:
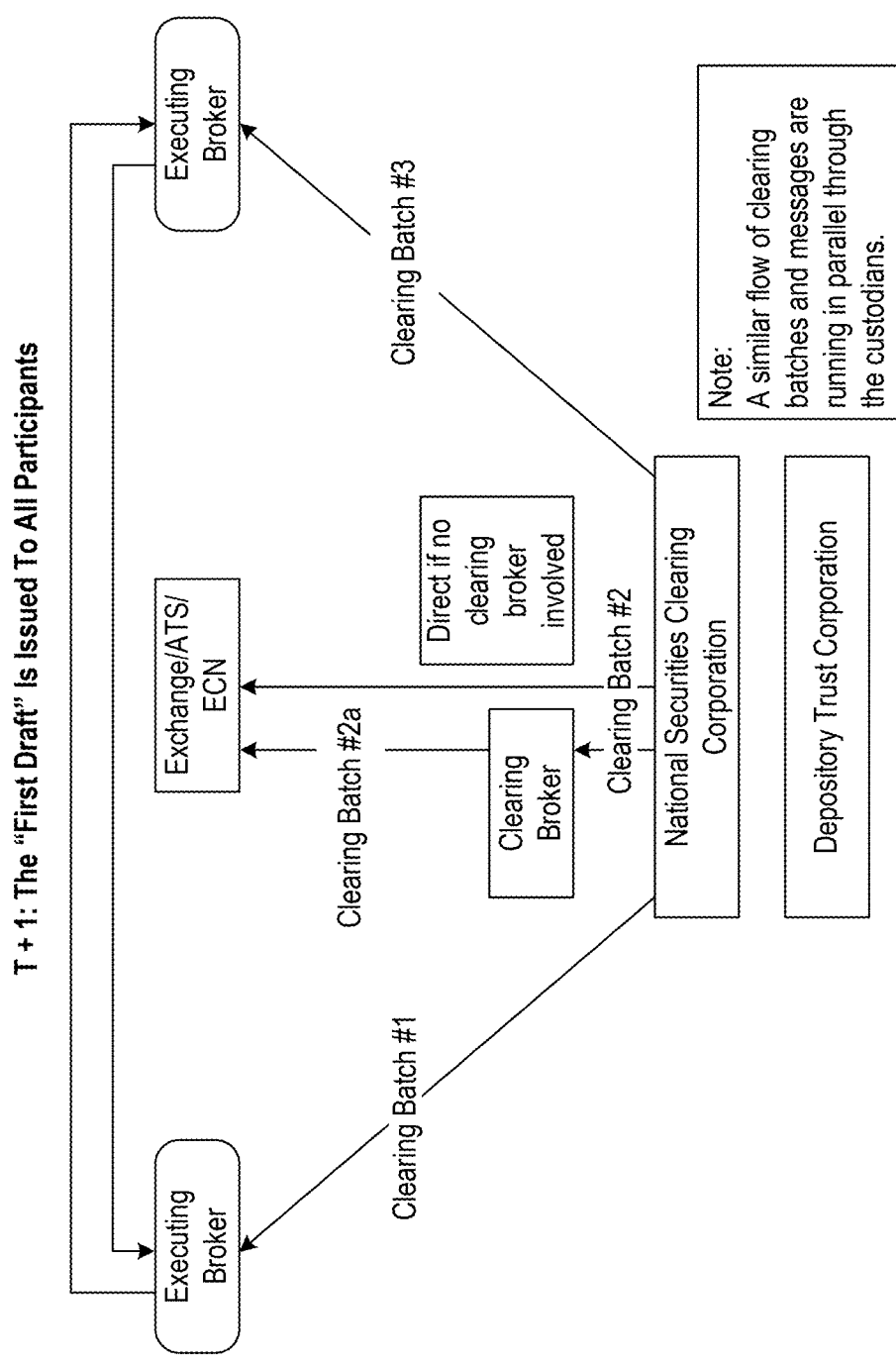
FIG. 2 is an equity exchange and settlement process as may traditionally occur one business day after the trade date ("T+1").

FIG. 2 illustrates what occurs one business day after the day of the trade (also referred to as "T+1"). Here, clearing batches are sent to each of the brokers, who have an opportunity to review and submit a contra report if a particular transaction is unfamiliar. But this often causes a significant delay because brokers are given one business day to review and manually dispute any potential trade.

There are a number of reasons why a broker may dispute a trade. For example, the broker may not know or remember the trade. Such trades are commonly referred to as "DK'd" trades, which indicates the broker "doesn't know" the trade. Part of the reason that DK'd trades happen in industry is that it is difficult to know who was at fault in causing the inaccurate information. Brokers may generate new orders every millisecond, which are matched by the exchange, but the exchange does not have time to check back with the broker to confirm order instructions and still match trades efficiently.

FIG. 3, meanwhile, illustrates what occurs two business days after the day of the trade (also referred to as "T+2"). Reconciliation batches are sent from the exchanges to the NSCC, either directly or through a clearing broker/house. Finally, the NSCC transmits settlement instructions to the Depository Trust Company (DTC) three business days after the trade, as illustrated by FIG. 4.

Embodiments of Cryptographic Consensus-Based Architectures for State Synchronization, and Associated Systems, Devices, and Methods Various embodiments are described herein that enable gross settlement of trades to occur in real-time. More specifically, various embodiments relate to systems and methods for including cryptographically signed clearing instructions with an order (e.g., to purchase or sell securities) to be carried out by an exchange.

Figure 5:
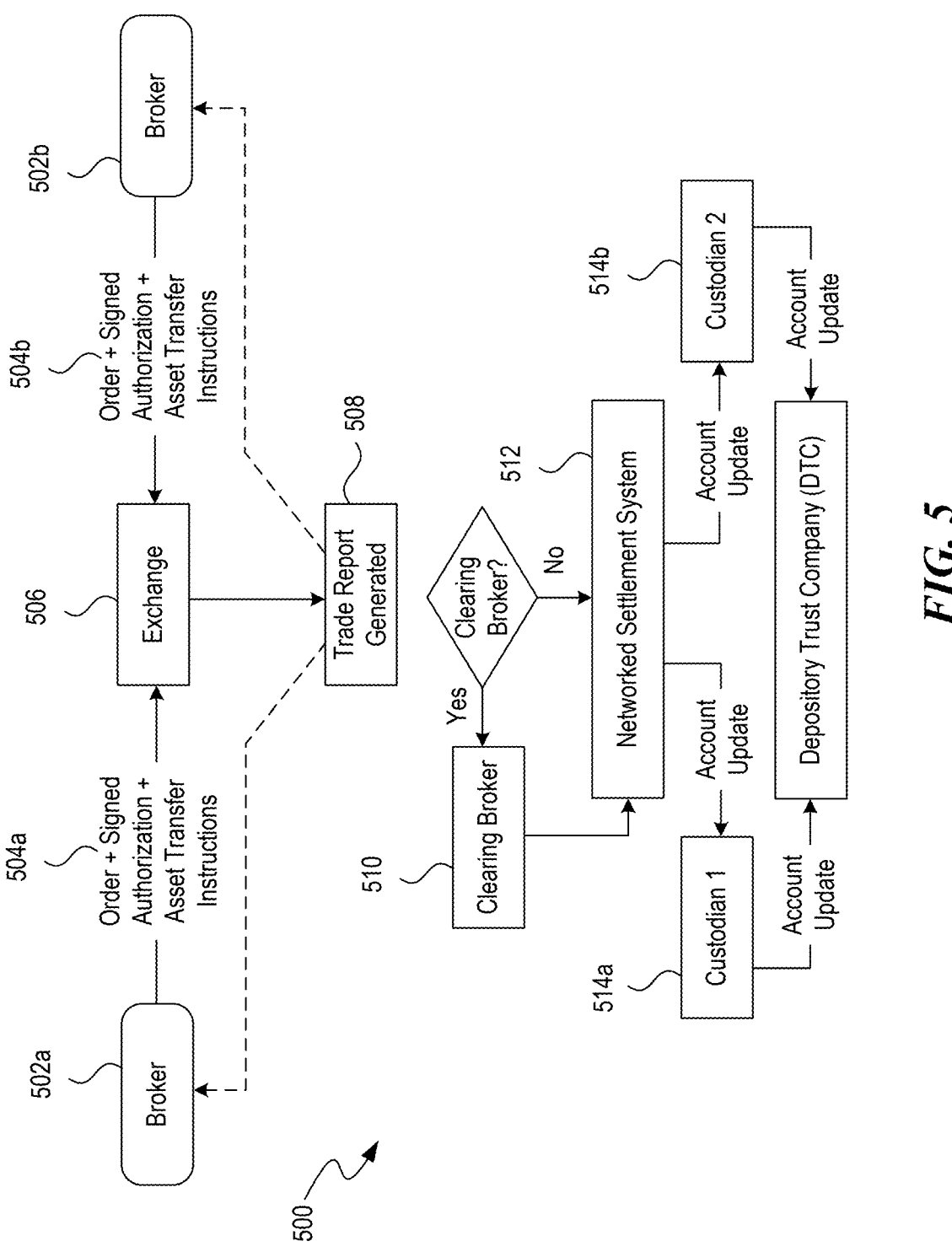
FIG. 5 is a work flow diagram of a straight-through gross-settlement process that occurs in real-time according to various embodiments.

FIG. 5 is a work flow diagram of a straight-through gross-settlement process 500 that occurs in real-time according to various embodiments. A broker 502*a-b* can include clearing instructions ("Signed Authorization") that are cryptographically signed with each order 504*a-b*. The cryptographic signature ensures the broker 502*a-b* generated an order 504*a-b* that exactly matches the signature. The order will fail to match the signature even if only a single character is changed. Therefore, only a party with access to a cryptographic private key owned by the broker 502*a-b* is able to generate a valid (i.e., matching) signature.

After processing the trade, the exchange 506 can generates a trade report 508 for each trade. The clearing instructions are then processed and sent to appropriate clearing brokers 510 or directly to a settlement system 512 for settling trades.

The system 512 can bundle a trade report and cryptographically signed clearing instructions into a data blocks. Data blocks are inserted into a permissioned, distributed, append-only ledger. The structure is similar to the "blockchain" used to support Bitcoin transactions; however, there are no "Bitcoin Miners" generating new assets and recording the transactions into blocks. Rather, the distributed, append-only ledger is operated by nodes on a distributed network on computers that both have and do not have complete copies of the primary ledger. Some such nodes store only secondary ledgers to the primary ledger. Using a primary ledger, the system 512 is able to create an unlimited number of side ledgers, or secondary and tertiary ledgers which contain only a subset of the global trade orders.

Cryptography can be used to verify the transactions within the series of ledgers and keep information (e.g., about trades, brokers) private. Each data block recorded on the ledgers contains a unique cryptographic hash. The hashes are available to all authorized parties, thereby allowing brokers and exchanges to review a real-time audit of settlements. Additionally, nodes to the primary ledger may include regulatory agencies.

Consequently, brokers are no longer given an opportunity to dispute order information in a trade once a trade report is generated when using the various embodiments described herein. The process starts with a stream (or several streams) of transactions. Today, some electronic exchanges generate thousands of transactions per second and may peak at a much higher rate closer to a million transactions per second. Transaction volume is likely to increase in the future. In the case of electronic exchanges, a trade report is generated for each transaction.

A matching signature assures that a particular broker generated and authorized specific order instructions, rendering the review period unnecessary. When a trade is "matched" by the system 512, the cryptographically signed clearing instructions are processed and account updates are sent to appropriate custodians 514*a-b*.

In addition to cryptographically signed clearing instructions, each trade can also include cryptographically signed asset transfer instructions that describe what, exactly, the broker 502*a-b* would like to trade. For example, a broker 502*a-b* may wish to sell 100 shares of ABC stock for $1,000 USD. Assuming the broker 502*a-b* owns more than 100 shares of ABC stock, the broker 502*a-b* can include instructions that indicate which 100 shares should be sold. In some instances the broker 502*a-b* may own shares of stock that are held by more than one custodian.

Figure 6:
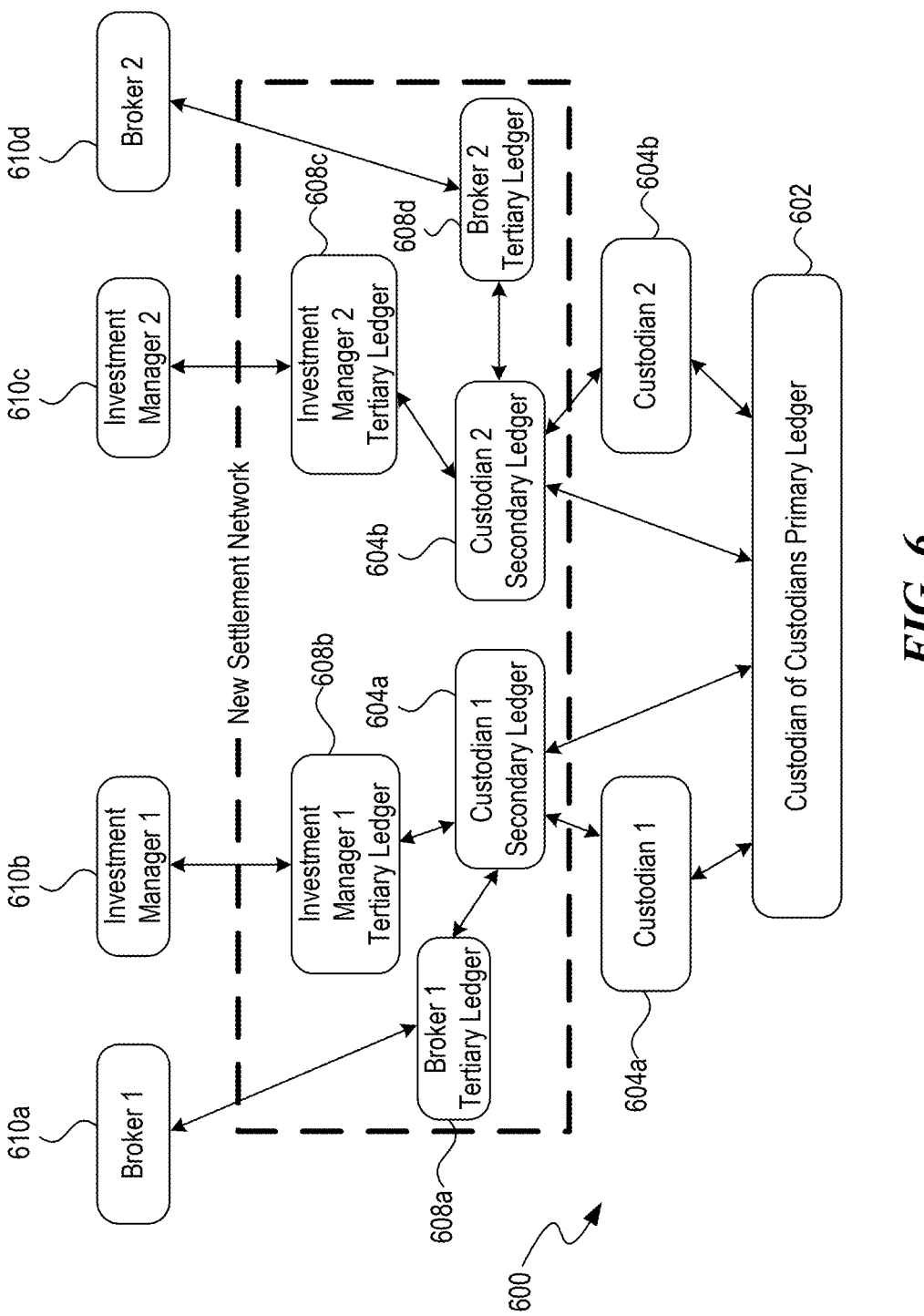
FIG. 6 illustrates the custodial relationships generated by a system that uses distributed ledgers to provide audits in real-time as may occur in some embodiments.

FIG. 6 illustrates custodial relationships generated by a system 600 that uses immutable ledgers to provide audits in real-time as may occur in some embodiments. In order to record assets balances in real time, the primary ledger 602 uses a timestamped, immutable electronic balance sheet 603, capable of handling a high volume of transactions. This balance sheet 603 will include a timestamped transaction log. Timestamped ranges of the balance sheet, including transaction log are hashed. The hash value can be kept inside or outside the balance sheet for audit purposes.

The primary ledger is an append-only data structure of unalterable history, and each data block within the ledger contains a cryptographic hash. The cryptographic hash is a function that is nearly, if not entirely, impossible to invert (i.e., recreate the input data from its hash value alone). The cryptographic hash functions generated by the system 600 described herein reveal no information about the content of the data block. Further, each hash function in the ledger can be hashed to create a Merkle Root. The Merkle Root, which is the hash of all the hashes of all transactions within a data block, can securely verify all of the block hashes in a ledger without disclosing any information about those hashes. The Merkle root may also be used to securely verify that a transaction has been accepted. More specifically, accepted transactions could be verified by downloading the Merkle Root and any block headers, rather than the entire ledger.

The system 600 further include additional ledgers including secondary ledgers 604*a-b* which correspond to custodians 606*a-b*. Custodians 606*a-b* may be able to simply pull data from secondary ledgers 604*a-b* to initiate account updates. Secondary ledgers 604*a-b* contain an incomplete history of transactions. The secondary ledgers 604*a-b* include only those transactions corresponding to securities held by the associated custodian 604*a*/606*a* and 604*b*/606*b*. The system 600 further includes tertiary ledgers 608*a-d* which are include only transactions for securities controlled by traders 610*a-d*.

The balance sheet 603 keeps track of a plurality of assets. These assets might include currencies, shares of stock, or other securities. Operations to the balance sheet 603 allow for traders 610 or other users to deposit, withdraw, or exchange assets. In addition, operations can be reversed by applying the opposite of an earlier transaction.

There are currently many different ways to keep track of account balances in real time. One popular way is to store account balances in a SQL relational database or a "NoSQL" database such as a key-value store. This method is only scalable up to the maximum transaction rate that a particular server is able to handle. In order to achieve higher transactions per second, systems are often "sharded" across multiple servers.

Once the network is partitioned, the well-known "CAP theorem" states that it is impossible to guarantee both consistency and availability (as defined by the theorem). Not wanting to sacrifice availability, many systems settle for "eventual consistency".

Relying on "eventual consistency" has many problems. One is that it forces the application developer to place additional checks on data which there is reason to suspect may be out of date before performing operations. Just like any software, it is easy for the application developer to make errors and create bugs in this code. It may be possible for applications to accidentally corrupt such data. In some cases where transaction logs are lost or not recorded, it may be impossible to repair corrupt data. In other cases, it may be possible, but difficult and tedious.

In the field of "Big Data", a technique has been developed to process and query large streams of data in real-time known as "Lambda Architecture". One key to "Lambda Architecture" is that data is all stored as append-only and immutable. Operations are performed on data in batches and also in real-time. The "CAP Theorem" still applies in "Lambda Architecture", and data is eventually consistent. However, timestamped batch processing provides a reference point for the eventual consistency.

A simple "Lambda Architecture" example is to imagine a process that counts how many times a particular word has been tweeted through all history. Thousands of tweets are being generated every second. In this hypothetical example, the number of times a word occurs in all tweets for a given hour is counted by a batch process. Each hour, the total count is added to the previous total to maintain a running hourly total. Suppose in the middle of an hour, a user wants to query the total real-time count. To generate the answer, a real-time process counts the number of times the word occurred in all tweets during the past partial hour (not yet included in the hourly batch processing). The real-time process then adds that number to the total count calculated from hourly batch processing history.

It is possible for this real-time count to be inaccurate, and inconsistent with the actual number of times a word was tweeted. For example, if a user generated the tweet immediately before the count query was executed, the new tweet might not get counted in the total. However, the hourly batch processing gives a consistent and accurate count for a given point in time, so a user knows that the count must be equal to the total count at the end of the last hour plus the real-time running total count for this partial hour only.

Some embodiments make use of techniques found in "Lambda Architecture" in order to create an immutable transaction log and balance sheet of assets that can scale to millions of transactions per second. The architecture is highly scalable, fault tolerant, highly available, and updated in real-time.

Two distributed clusters of services are set up to handle the incoming transaction stream. These two services are the "Workers" and the "Supervisors". Workers are responsible for taking each transaction report in the stream and processing them. Each report is processed for both the transaction log and balance sheet. In addition, the balance sheet and transaction logs each have batch jobs, real-time jobs. Enough workers are spawned to handle the real-time load. For example, if it takes a worker one second to process a report completely, and 1000 reports are generated per second, at least 1000 workers are spawned to process jobs, or a backlog will occur. The system scales workers dynamically to handle larger loads during peak transaction volume times.

Supervisors have several roles in supervising the workers. Supervisors ensure that reports are allocated correctly to worker processes so that each job is only processed once, and the work is spread out to all available workers in parallel. Supervisors coordinate how messages are passed between workers. A report may need to go through several steps, from several different workers before it is processed. Supervisors check for failures and try to replay failed jobs. Jobs may fail for any number of reasons, including a worker being powered-off mid-job. Checking for, and replaying failed jobs gives this system fault tolerance.

The workers and supervisors take reports from the transaction stream in order to build a transaction log, and a balance sheet. The transaction log is simply an append-only immutable log of incoming transactions. Every so often, the latest transaction events are appended the full history of transaction log events from batch processing. This is one location where the "Lambda architecture" is utilized. Until the recent transaction events are appended across every node on the primary ledger, the system approximates to provide traders with estimated data.

Each batch process creates a new timestamped immutable transaction log. A hashing algorithm such as a SHA256 Checksum can be run on the transaction log. The checksum can then be appended to the transaction log, or kept outside the transaction log in a checksum log. A checksum helps to audit and ensure that data in the transaction log is not changed.

Occasionally, it may be desirable to prune the transaction log for disk space savings. In order to allow for this, checksums may be created on a rolling basis. For example, if checksums are generated hourly, weekly, and monthly, log data older than a month can be dropped from a working transaction log (and possibly archived), while still using existing checksums to audit current log data.

In addition to a transaction log, a balance sheet is also generated by worker processes. The balance sheet creates a record with the total amount an account holds of any given asset. For each transaction, an amount changes on a balance sheet for one or possibly several assets. However, data is never mutated on these balance sheets. Rather, the amount value for each asset is timestamped. When the value changes, a new record is created and appended to the balance sheet with the current timestamp.

In order to query the most recent balance sheet records, the system only return the most recent record for each asset.

Like transaction logs, balance sheets can be hashed, and the hash can be recorded for audit purposes. In addition, old balance sheet data can be discarded and archived when it is deemed no longer needed for a given application.

Balance sheet audit hashes and transaction log audit hashes can be appended to an audit hash file. This file itself can be hashed, and the resulting checksum can be used to guarantee the integrity of an enormous number and size of records.

It is possible for a short window of time to double-spend assets. For example, where a user has $1000 on a balance sheet, and would like to withdraw that $1000 twice. If that 2 workers process append a withdraw transaction to the transaction log, and update the balance sheet at exactly the same instant.

Accordingly, there is also an error checking worker process. After the double-spend occurs, the error checking worker will discover the error. The error checking worker then applies a transaction to the transaction log to reverse an invalid transaction, and the error checking worker then updates the balance sheet.

Additionally, business logic that reads the balance sheets can be programmed to only trust data older than a few seconds. Accounts with high numbers of transaction reversals could also be frozen and manually investigated for fraud.

Figure 7:
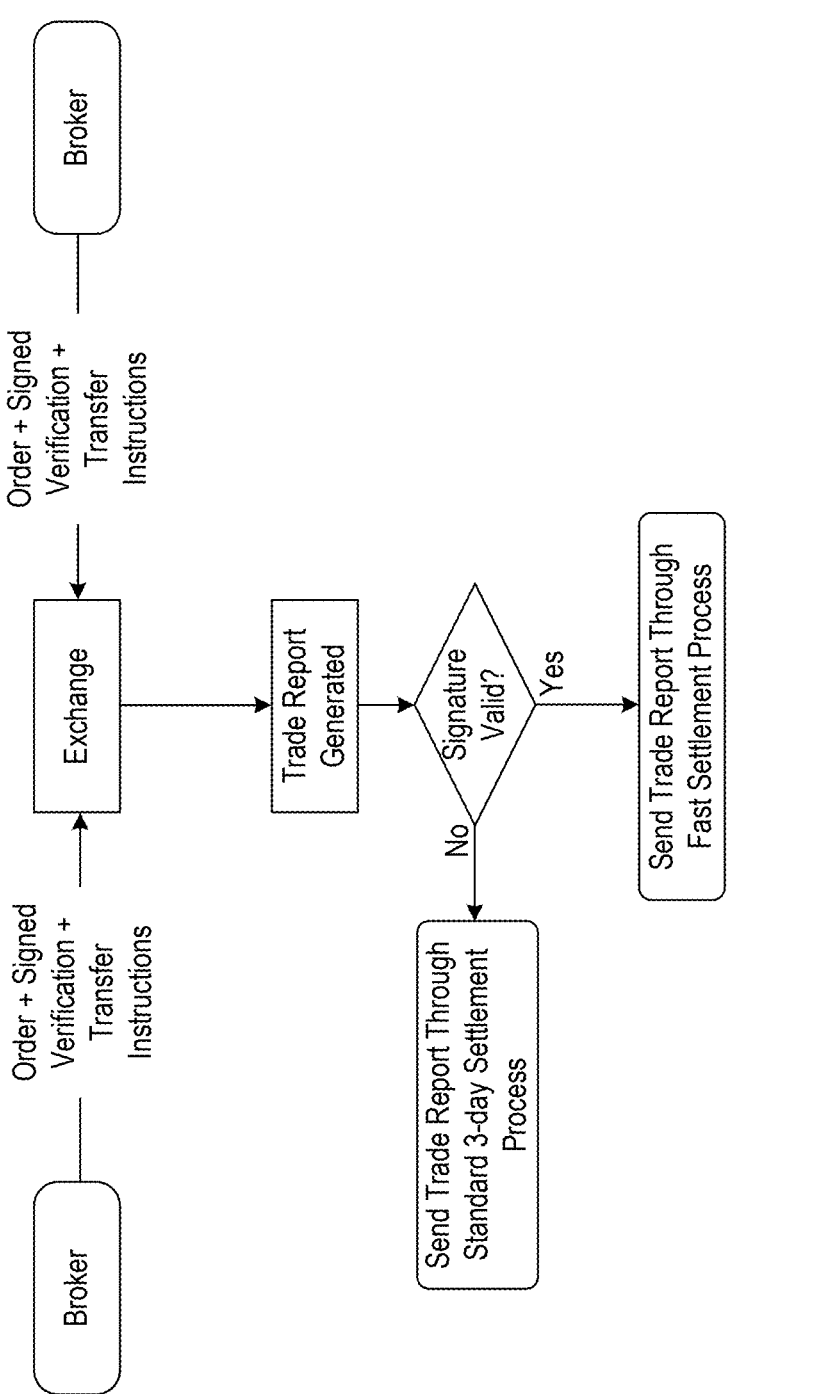
FIG. 7 illustrates the default fallback position if the system determines the clearing instructions are invalid as may occur in some embodiments.

FIG. 7 illustrates the default fallback position if the system determines the clearing instructions are invalid as may occur in some embodiments. More specifically, some embodiments provide that a system (e.g., system 600 of FIG. 6) determines whether the necessary conditions are met in order to use the "fast track" settlement process described herein. For example, the system may determine whether the cryptographic signature of the order is valid (i.e., matches the cryptographic private key owned by the broker). If the system determines conditions are not met (e.g., signature invalid), then the trade simply reverts back to the traditional three-day settlement process, which is described in-depth above with respect to FIGS. 1-4.

Figure 8:
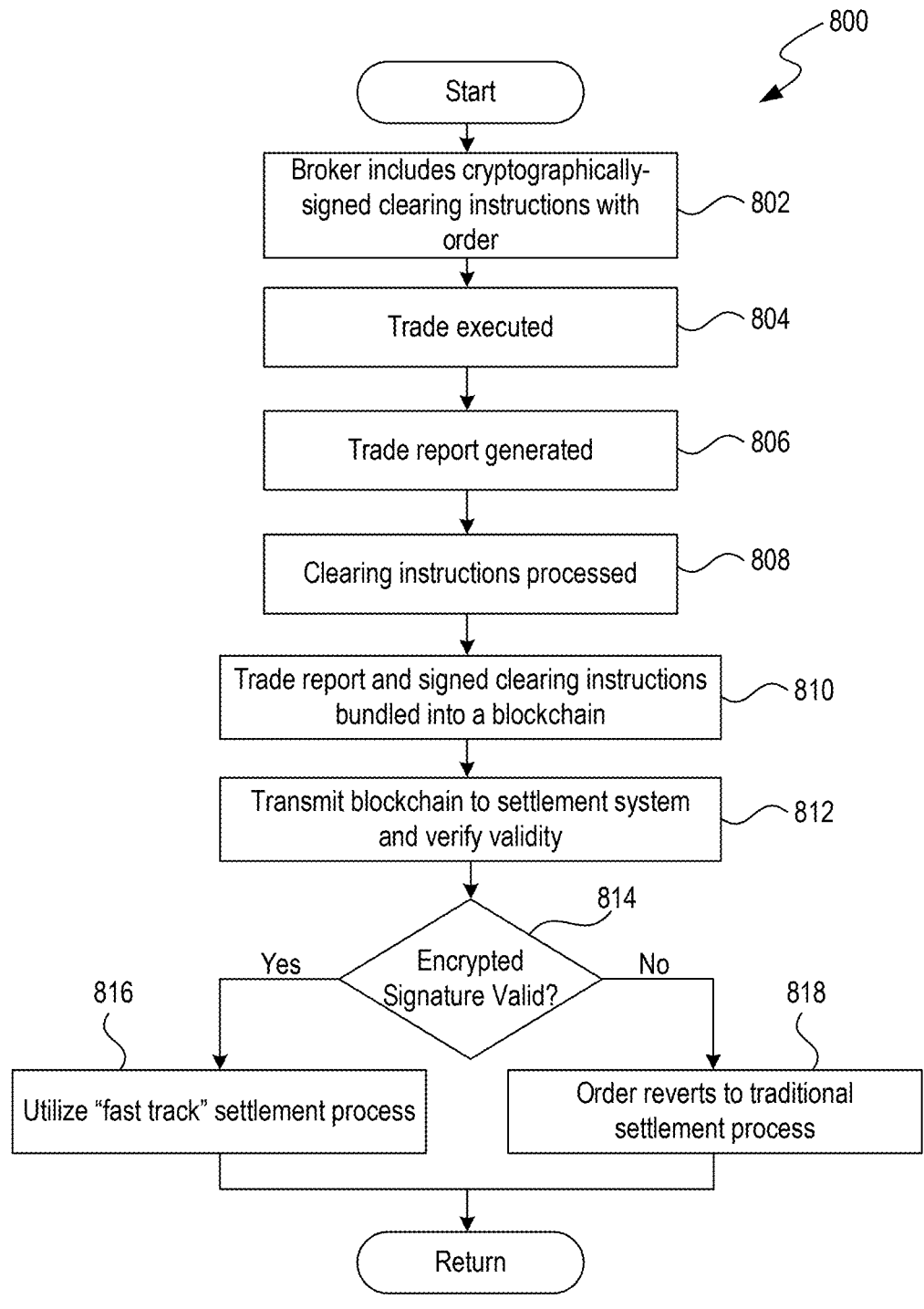
FIG. 8 is a flow diagram of a process for enabling gross settlement of executed trades in real-time according to various embodiments.

FIG. 8 is a flow diagram of a process 800 for enabling gross settlement of executed trades in real-time according to various embodiments. At step 802, numerous brokers include cryptographically signed clearing instructions with an order to be executed by an exchange. In some embodiments, each trade includes various cryptographic keys that are used to verify each of the parties to a transaction. For example, an order can include the private key of the seller, public key of the seller, and public key of the buyer. A public and private key pair includes two uniquely related cryptographic keys. As described above, the public key is generally published periodically and made available to those that use the system (e.g., brokers). The private key, however, remains confidential to its respective owner (e.g., a particular broker). Because each public/private key pair is mathematically related, the public key can only by decrypted by the "matching" private key.

At step 804, a plurality of trades across the monitored network are executed by the exchange. At step 806, the exchange generates a stream of trade reports summarizing the transactions. At step 808, the clearing instructions are processed and transmitted to the appropriate clearing broker(s). At step 810, the trade report and/or cryptographically signed clearing instructions are processed and observed by a plurality of worker programs and supervisor programs each running on one of a plurality of nodes associated with the primary ledger. Processed transactions are placed into data blocks on the primary ledger. Each transaction in a data block is cryptographically signed with public and/or private keys that allow various parties (e.g., brokers, settlement system) to decrypt the transaction.

At step 812, the primary ledger propagates through to the lower tiered ledgers. Only data blocks relevant to the lower tier ledgers is propagated to each individual lower tier ledger. This enables the lower tier ledgers to be more light weight and require less disk space. Transactions that occur across more than one lower tier ledger include instructions in the transaction record that provide reference to the other lower tier ledgers. In this way, to view the entire transaction record, one may view the primary ledger, or view the combination of relevant data blocks on the relevant lower tier ledgers. to the settlement system, which can then verify the validity of the order by analyzing the encrypted signature. As shown at step 814, if the settlement system determines the cryptographic signatures are valid, the order will proceed using the "fast track" settlement system described herein, as shown at step 816. However, the order will revert to using the traditional three-day settlement process if the system determines the signature is invalid (e.g., from possible tampering), as shown at step 818. Valid signatures will cryptographically match and no error will appear in the ledger. Non-matching signatures at one node will not propagate to other nodes and the consensus of the primary ledger ignores the erroneous node until that node is repaired.

Consequently, the process 800 allows every broker transaction to be tracked and recorded using a cryptographic ledger infrastructure. Moreover, the process 800 is able to ensure validity by verifying the cryptographic key(s) used for each order. Highly decentralized and redundant verification makes broker review unnecessary, thereby significantly reducing the time needed to deliver securities.

Figure 9:
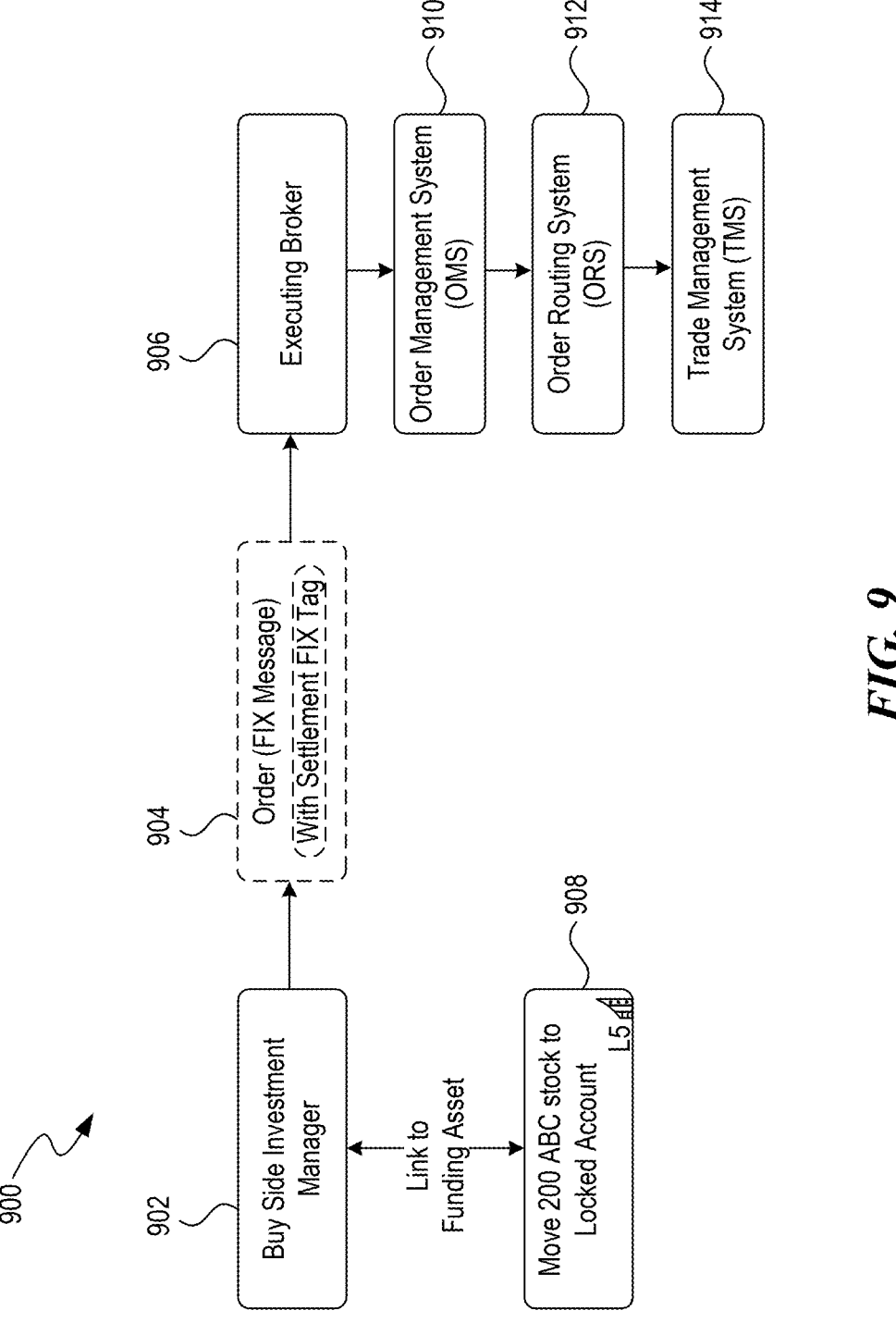
FIG. 9 is a communication chart describing an investment manager interacting with an order management system.

FIG. 9 is a communication chart describing an investment manager interacting with an order management system. A Investment manager 902, such as BlackRock, or other equivalent, uses existing order entry software that has a settlement FIX Tags 904. In some embodiments a settlement FIX tag 904 is a short hash of 30-50 characters. Once received, in order entry software, the settlement FIX tag 904 is matched up with further settlement instructions which include many more characters. The cryptographically signed order instructions must match the original settlement FIX tag 904 when hashed to show the instructions are genuine.

The settlement FIX Tag 904 allows the trader 902 to link an order to a funding asset recorded on tertiary ledger (e.g. ledger 608 of FIG. 6) 908. The settlement FIX Tag 904 will authorize a broker 906, such as Morgan Stanley or other equivalent, to send settlement instructions to an order management system 908, and instruct the order management system (OMS) 910 to straight-through-process (STP) and real-time gross settle (RTGS) the trade. The instructions are encrypted and hashed to reduce latency. An order routing system (ORS) 912 selects available shares for the broker 906, and a trade management system (TMS) 914 reports the trade to the primary ledger (e.g. ledger 602 of FIG. 6).

The trader 902 will have a copy of the tertiary ledger 908 on their server or PC. During order entry, settlement system software designates funding assets on the tertiary ledger, locking that asset to the order. Ledger software creates a new data block on that tertiary ledger 908 and moves the funding asset out of an "available" account to a "locked" account. For example, if the trader's 902 tertiary ledger shows 1,000 shares of ABC stock available, and the trader 902 enters a limit order to sell 200 ABC, then 200 ABC is moved into a "locked account".

The movement of 200 ABC to a locked account is propagated through all levels and tiers of ledgers, establishing a consensus. This prevents double spending, eliminating counterparty risk. (If the trade is canceled, the locked ABC will move back to the available for sale account.) When a trade is executed the ORS 912 uses settlement instructions and authorizations to STP and clear the trade. The TMS 914 then RTGS (reduce locked ABC, increase cash vs. the counter party), by applying ledger updates to the primary ledger and propagating the updates to lower tier ledgers, establishing a new consensus. The Investment Manager 902 cannot mistakenly sell something not owned, trades STP and RTGS reducing risk and settlement costs.

Figure 10:
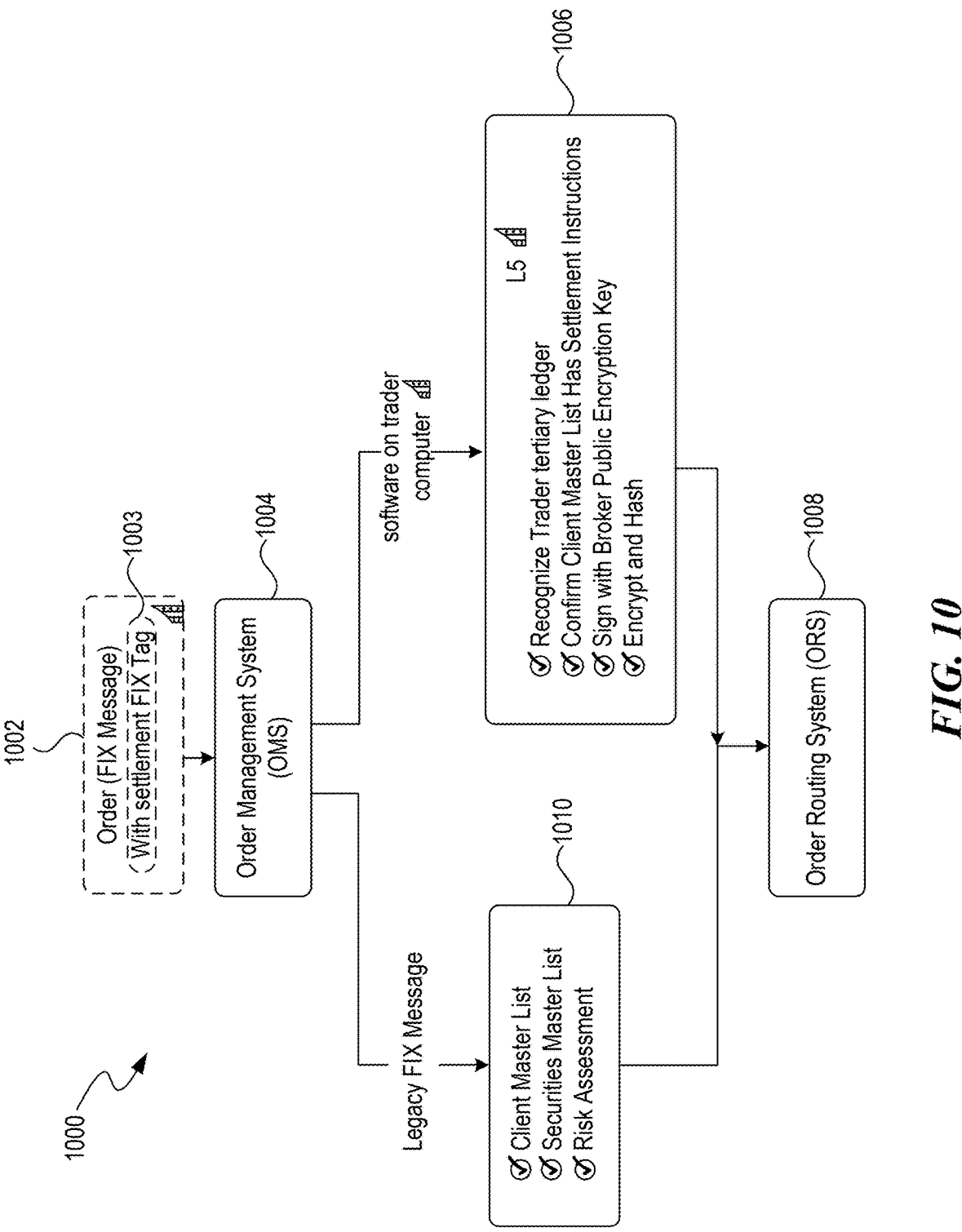
FIG. 10 is a communication chart describing a broker interacting with an order management system.
Figure 11:
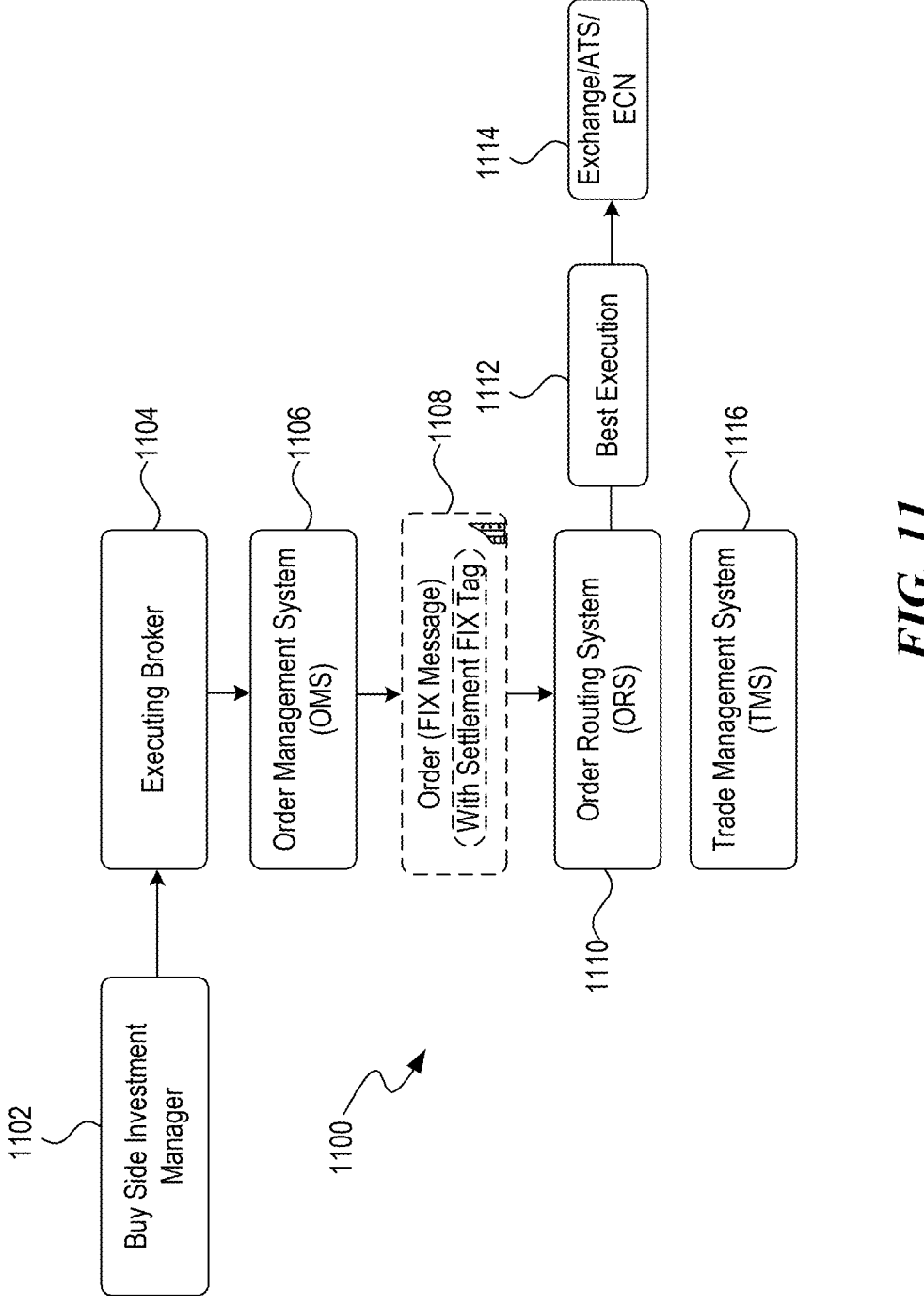
FIG. 11 is a communication chart describing a broker executing trades.

FIGS. 10 and 11 are a communication chart describing a broker interacting with an order management system and a communication chart describing a broker executing trades. An executing broker, such as Morgan Stanley or an equivalent, runs an order 1002 through the Order Management System (OMS) 1004 which checks the Client Master List and Security Master List. An embodiment of that order 1002 will include a settlement FIX tag 1003. Simultaneously, the OMS 1004 will send the settlement FIX tag 1003 to a new Hardware Security Module (HSM) 1006, the HSM 1006 is a software module installed in the broker's data center.

The HSM 1006 will receive, process and send the settlement FIX tag 1003 to the Order Routing System (ORS) 1008. When accepting settlement FIX tags 1003, the ORS 1008 confirms the broker has instructions, but does not attach them for latency reasons. The ORS 1008 additionally signs transactions with varying public keys that change based on assets sold. Encrypting instructions within the ORS 1008 prevents information leakage, and hashing reduces data transfer and latency. The executing broker's ORS 1008 sends the order out for best execution.

The ORS 1008 also receives legacy FIX messages 1010. Legacy messages 1010 are still processed at the T+3 rate.

FIG. 11 illustrates the same process as FIG. 10 in flow-chart form.

Figure 12:
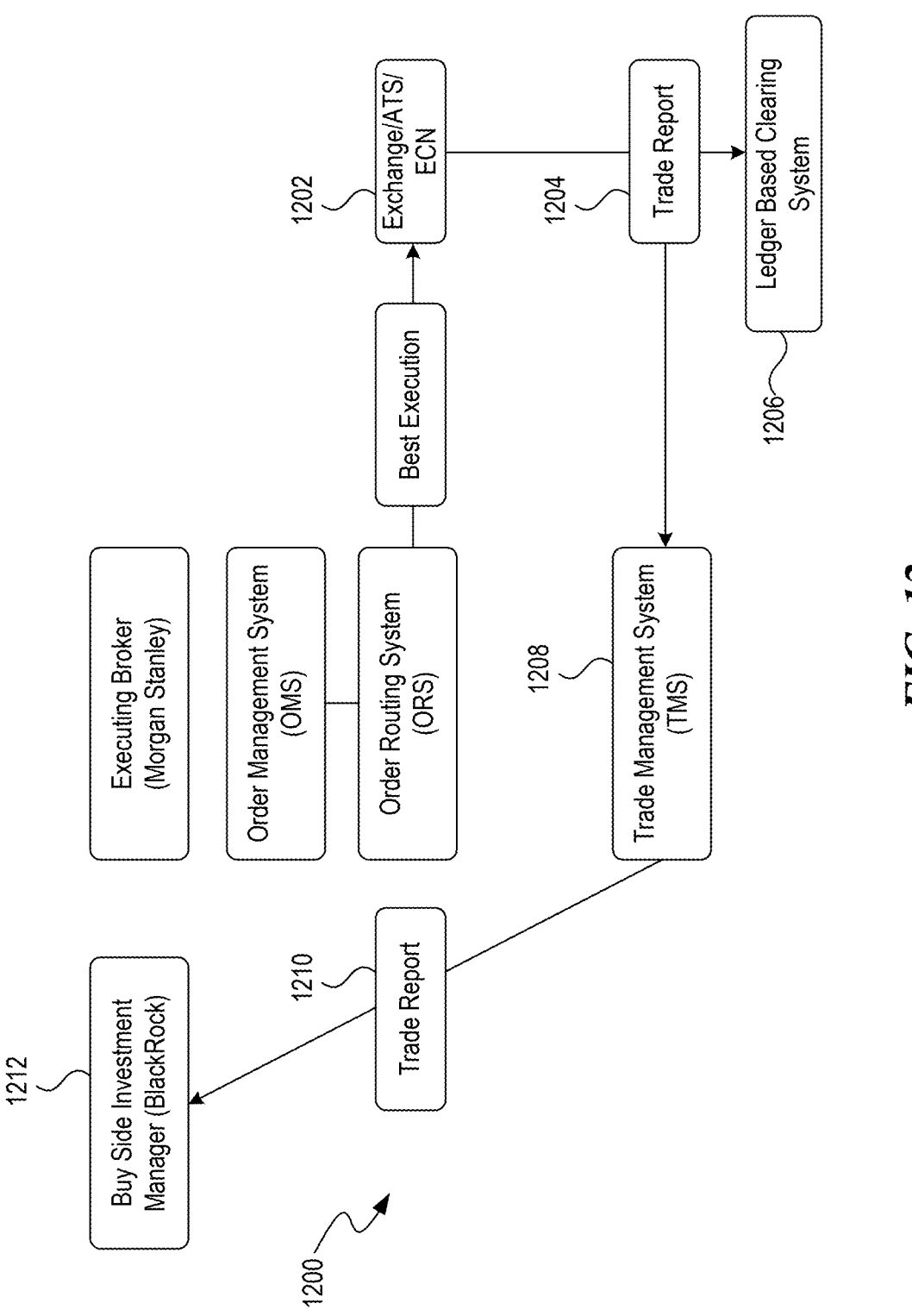
FIG. 12 is a communication chart describing actions taken by an exchange.

FIG. 12 is a communication chart describing actions taken by an exchange. The exchange 1202 receives an order and recognizes the settlement FIX tag. The exchange forwards a copy of the trade report 1204 to the ledger based clearing system 1206. Because the settlement FIX tag has been encrypted and hashed, only ledger based clearing system users can see the data, so there is no information leakage. Exchanges will benefit because industry participants will prefer exchanges that support STP and RTGS. Exchanges will also cuts costs of managing trade fails.

Figure 13:
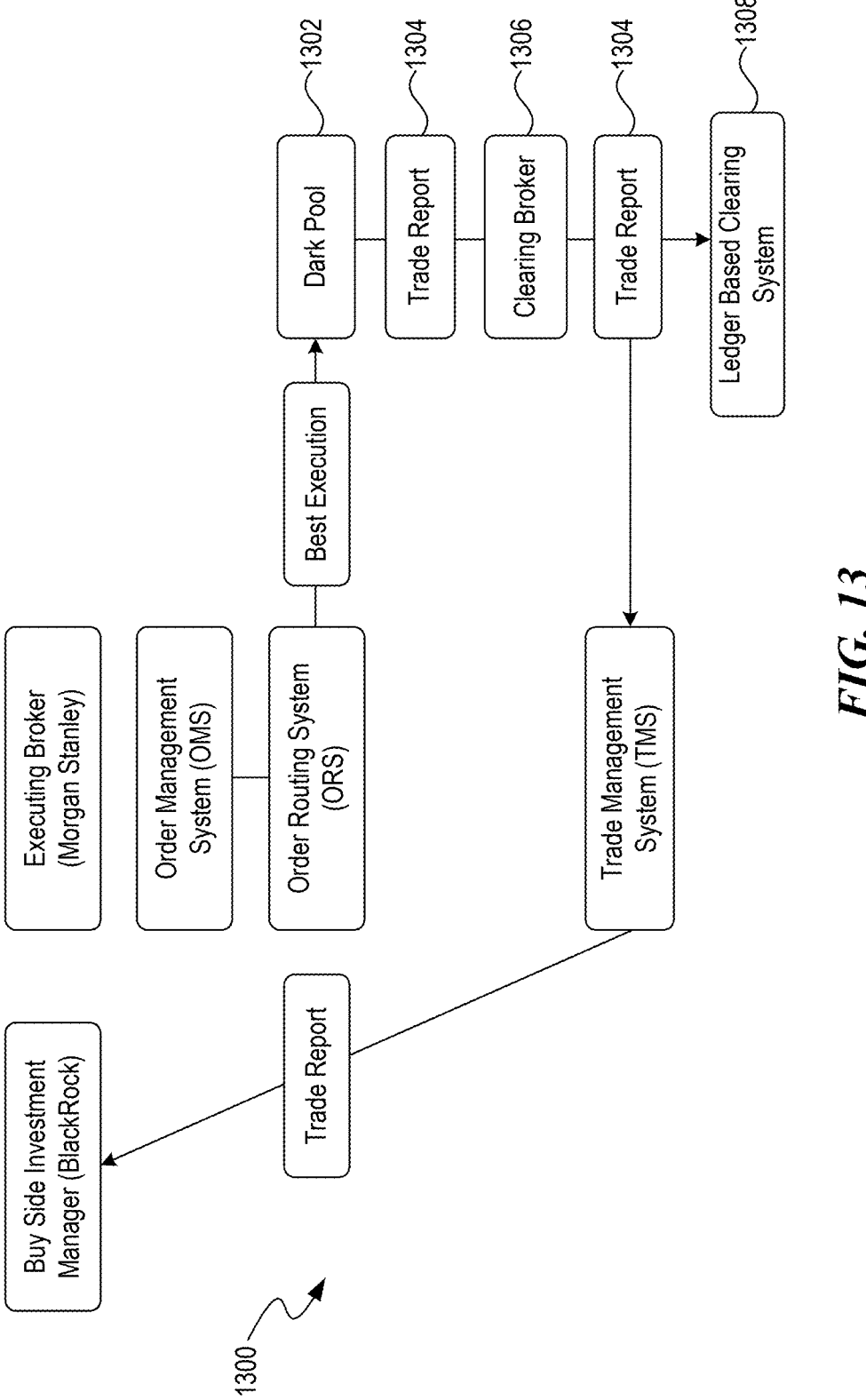
FIG. 13 is a communication chart describing how a clearing broker interacts with a dark pool exchanges.

FIG. 13 is a communication chart describing how a clearing broker interacts with a dark pool exchanges. The procedure is very similar to those of FIG. 12. Dark pools 1302 send trade reports 1304 to clearing brokers 1306. The clearing broker installs the same software that exchanges use to forward the trade report to the ledger based clearing system 1308. Clearing brokers 1306 will benefit because dark pools 1302 will prefer exchanges that support STP and RTGS. Clearing brokers 1306 also cut costs related to managing trade fails.

Figure 14:
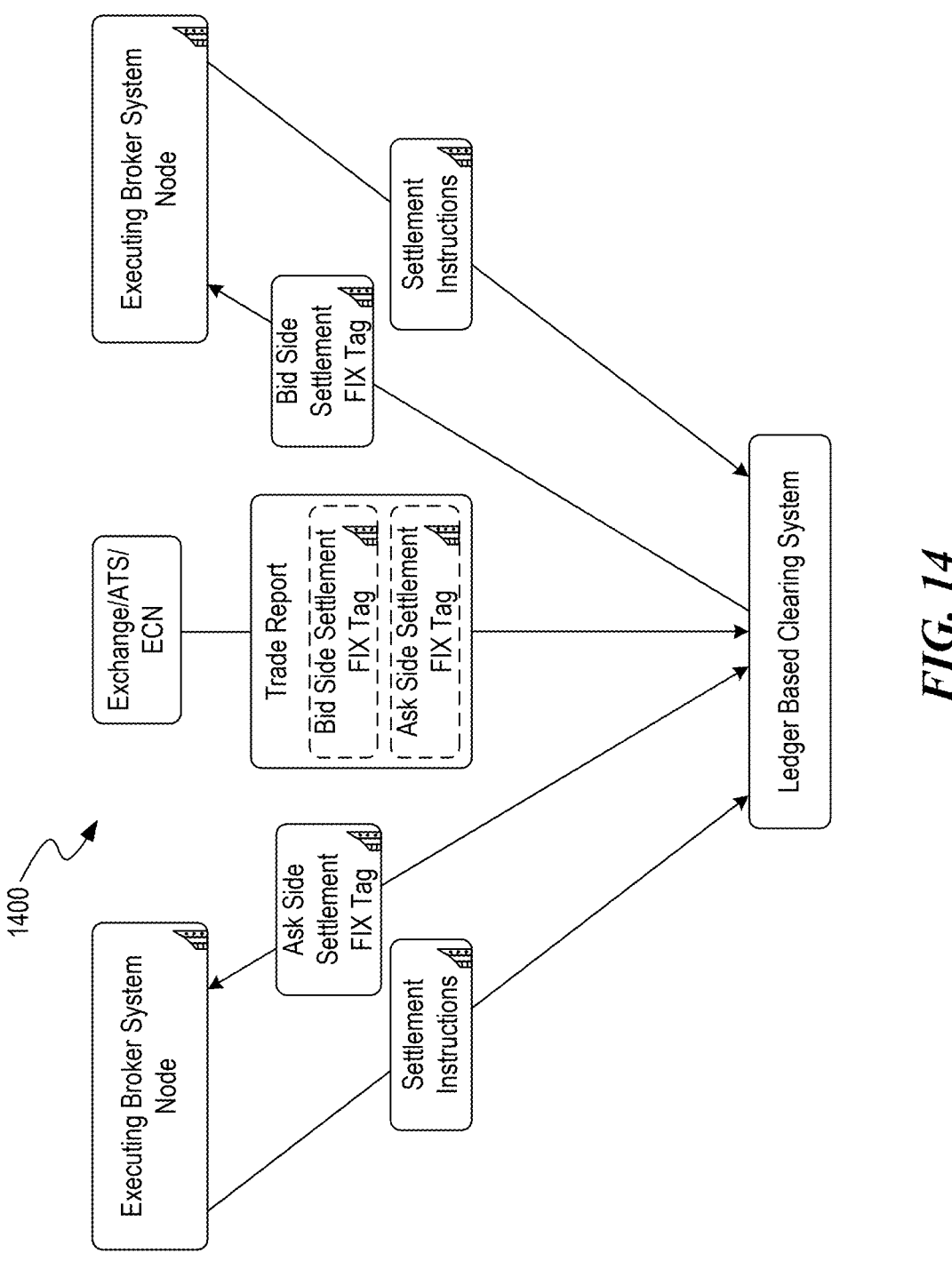
FIG. 14 is a communication chart describing clearing system interaction with an external system nodes.

FIG. 14 is a communication chart describing clearing system interaction with an external system nodes. Ledger based clearing system 1402 receives trade reports 1404 from the exchange 1406, and uses the settlement FIX tags 1408*a-b* (which are 40-character hashes) to request settlement instructions 1410*a-b* from executing brokers through each respective system node 1412*a-b*. Settlement instructions 1410*a-b* are often 1200+ characters in length; accordingly, transferring 40 character hashes is much faster and less demanding on latency. The system nodes 1412*a-b* collect settlement instructions from the client master list, and reply to the ledger based clearing system 1402 using brokers' encrypted signatures. The cryptographically signed order instructions 1410*a-b* must match the original 40 character hash 1408*a-b*, when hashed. The Clearing system 1402 effects RTGS by updating ledgers on the primary ledger L1 and propagating changes to lower tier ledgers L2-L5. The ledger based clearing system 1402 internalizes settlement, and depository trust corporation (DTC) records do not change.

Figure 15:
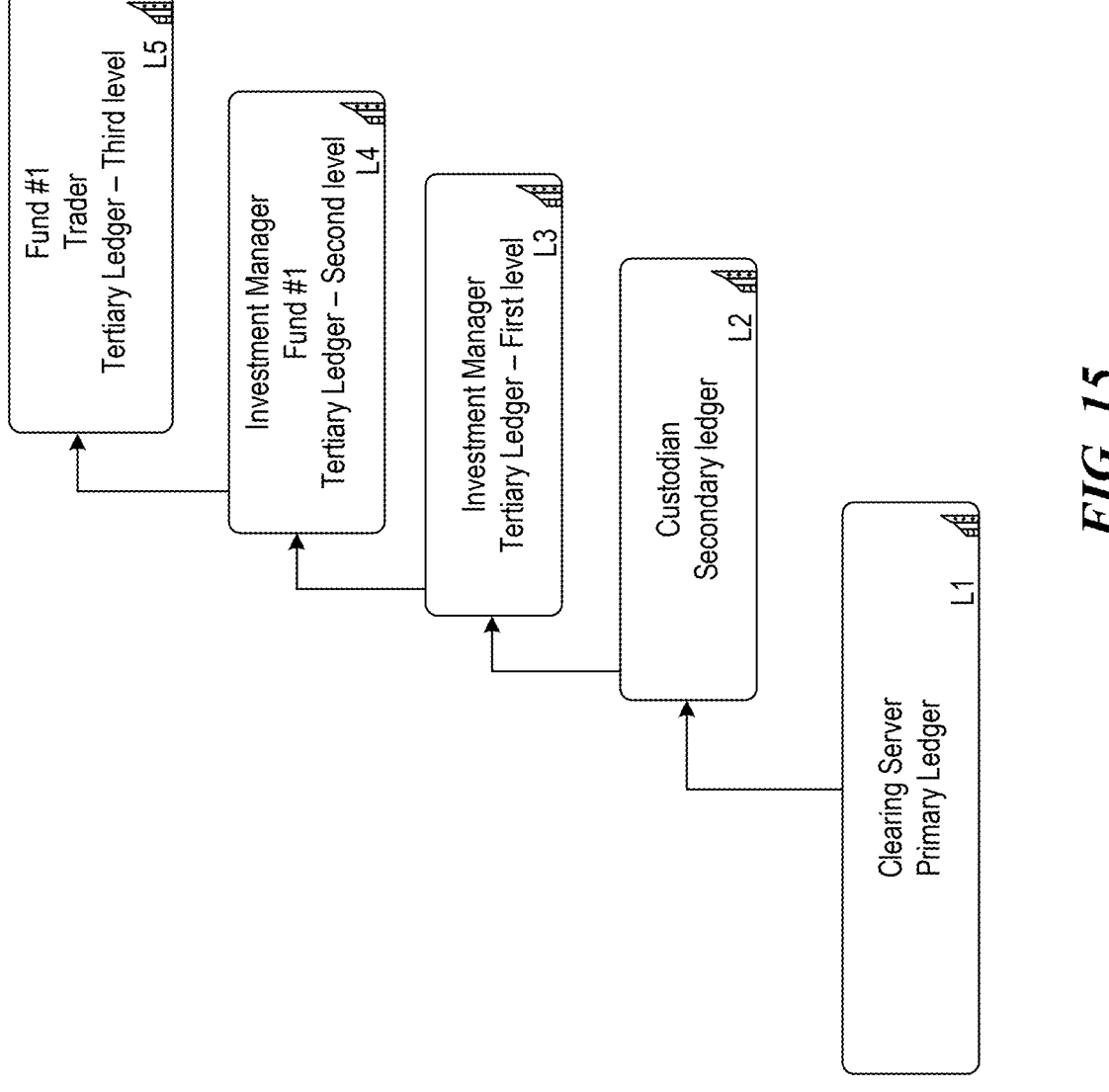
FIG. 15 is a block diagram describing an embodiment of tiers of cryptographic ledgers.

FIG. 15 is a block diagram describing an embodiment of tiers of cryptographic ledgers. Each block represents a level of append-only cryptographic ledger. At the first level L1, there is only a single primary ledger. Every level above that branches out into exponentially more ledgers. L1-L3 comprise the primary, secondary, and tertiary ledgers. L3-L5 comprise the three levels of tertiary ledger.

Investment Mangers hold stock at Custodians. Custodians' relationships with their clients do not change. Custodians continue to service their clients and their clients' assets. Custodians can now provide enhanced services to their clients by offering STP and RTGS. Custodians can administer assets more efficiently on Secondary ledgers L2. Custodians will instruct DTC to move securities onto the primary ledger L1. By holding securities for multiple custodians, the primary ledger L1 can internalize and RTGS trades that would otherwise settle at DTC. The primary ledger uses brokers' encrypted signatures to STP clear trades, and apply ledger updates to the primary ledger L1 to achieve RTGS. Ledger updates will automatically propagate lower tier ledgers L2-L5.

The Custodians, Investment Managers, families of funds and individual traders can view and move assets based on Network permissions. If a Custodian wants to offer RTGS to a client, the custodian will instruct DTC to deposit assets with the ledger based clearing system for the benefit of the Custodian. The ledger based clearing system records the securities on the primary ledger L1. This can be done promptly. If an executed trade does not have settlement FIX Tags for both sides, the settlement diverts to DTC. In this case, the ledger based clearing system will deliver the securities to DTC for the Custodian's account.

When reporting to their clients, Custodians will provide consolidated reports showing assets held directly at DTC and at DTC through the ledger based clearing system.

In some embodiments, settlement banks open accounts with the ledger system's Interbank Settlement System (ISS). Settlement Banks will instruct the Fed, using Fedwire, to fund the accounts at ISS on a daily basis. The ledger system will record funds deposited with ISS on the primary ledger L1, and propagate through the lower tier ledgers L2-L5 as appropriate before the start of trading.

Traders can then place orders using settlement FIX tags, which will move cash required to settle trades to a locked account on a low level tertiary ledger L5. When trades are executed, the ledger based clearing system acts as "Settlement Agent" and sends ledger updates to ISS. ISS then sends ledger updates to settlement banks in real time. At the end of the day, the ledger system will send all funds back to the Settlement Bank's account at the Fed, so their account at ISS is flat overnight.

Figure 16:
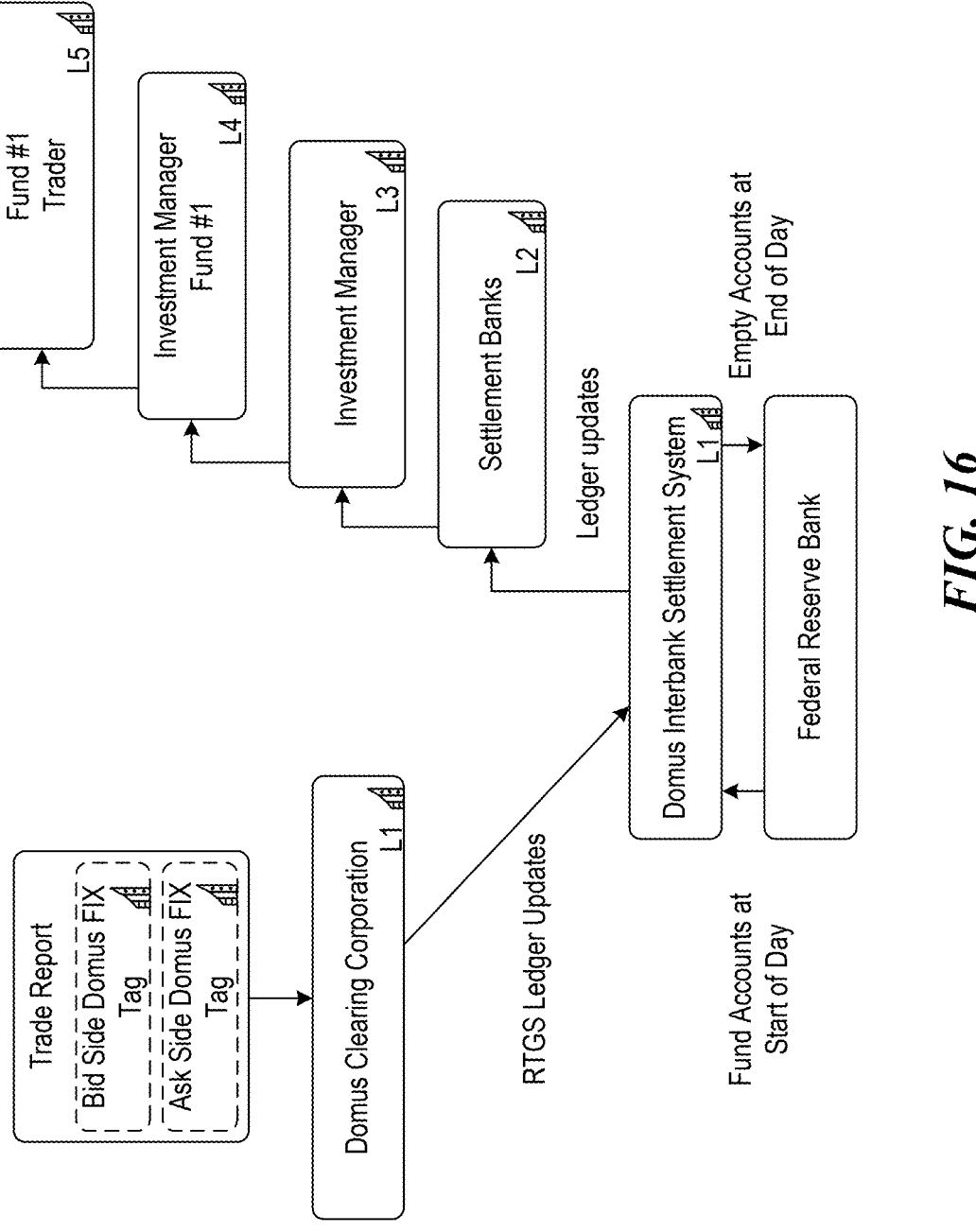
FIG. 16 is a block diagram describing regulatory communication.

FIG. 16 is a block diagram describing regulatory communication. Distributed ledgers, build consensus on private nodes. A sufficient number of private nodes are utilized to satisfy SEC and FINRA regulation. Nodes can also be maintained by the SEC, FINRA, an auditor, and others. Special ledgers that containing hashed data are made available for audit purposes. The entire history of the cryptographic ledgers can be audited and confirmed by regulators and accountants in real time, any time, against immutable content. The ledger system makes secondary ledgers L2 available to DTCC so the DTCC can service custodian assets directly.

Figure 17:
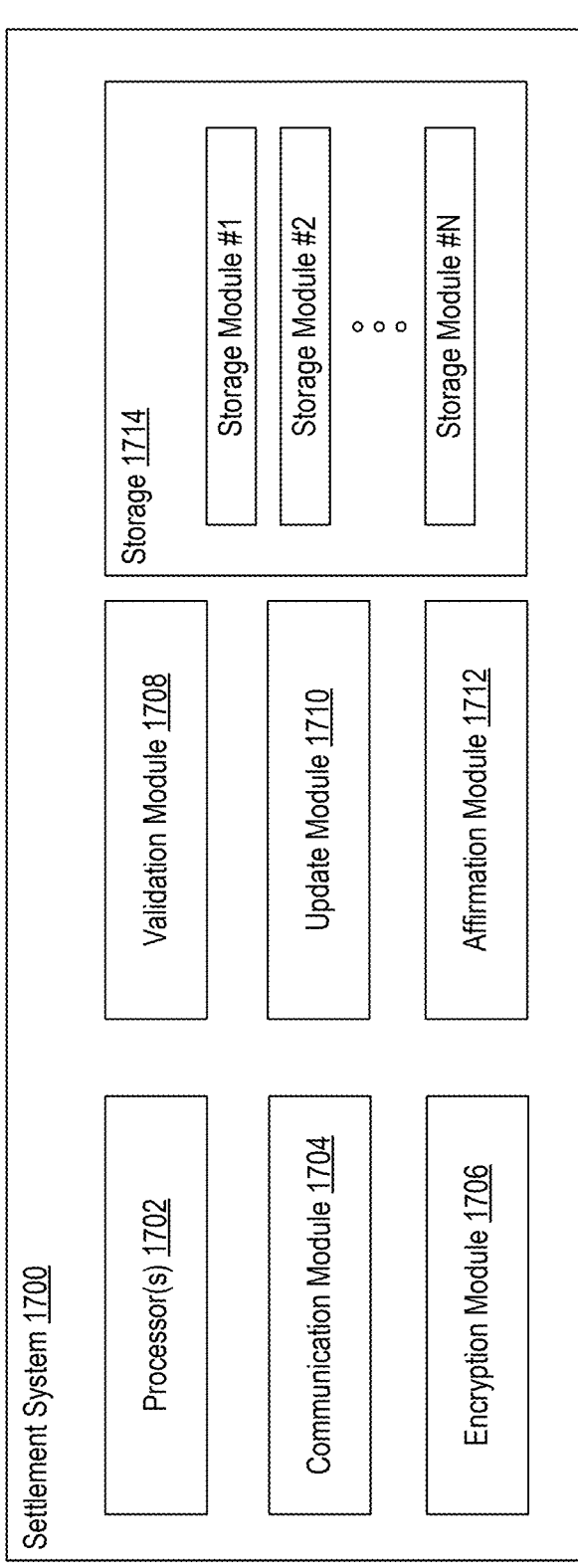
FIG. 17 is a block diagram with exemplary components of a settlement system 900 for accelerating the settlement process.

FIG. 17 is a block diagram with exemplary components of a settlement system 1700 for accelerating the settlement process. According to the embodiment shown in FIG. 17, the system 1700 can include one or more processors 1702, a communication module 1704, an encryption module 1706, a validation module 1708, an update module 1710, an affirmation module 1712, and a storage 1714 that includes a first storage module, second storage module, etc., through an Nth storage module. Other embodiments of the settlement system 1700 may include some, all, or none of these modules and components, along with other modules, applications, and/or components. Still yet, some embodiments may incorporate two or more of these modules into a single module and/or associate a portion of the functionality of one or more of these modules with a different module.

The communication module 1704 can be configured to receive encrypted orders, cryptographically signed authorizations, trade reports, etc., from one or more exchanges. The communication module 1704 may be configured to receive the aforementioned materials in real-time (i.e., immediately or shortly after the order is placed by the broker) or at pre-determined time intervals. Real-time transmission throughout the day is generally preferred because it lessens settlement risk.

The encryption module 1706 bundles trade reports and cryptographically signed instructions into the primary ledger, as well as encrypt each data block on the primary ledger using one or more cryptographic public and private keys. Using a primary ledger, the encryption module 1706 may be able to create an unlimited number of lower tier, secondary and tertiary ledgers, which contain a subset of global trade orders. Each data block typically represents a set of updates (e.g., trades) to be made to the accounts of various brokers. However, the orders may also be grouped by broker(s) using, for example, the cryptographic public keys.

When a trade reports are received by a node in the settlement system 1700, the validation module 1708 can determine whether the signature is valid. That is, whether the signature matches the cryptographic private key owned by the broker. An update module 1710 can be configured to generate and transmit account updates for various custodians. In some embodiments, the custodians are able to access a balance audit or ledger that includes all past transactions associated with the custodian.

An affirmation module 1712, together with the validation module 1708, can determine whether a particular trade is eligible for the "fast track" settlement process. For example, if the validation module 1708 determines the signature does not match the broker's private key, the affirmation module 1712 can reject the trade. When a trade is rejected, traditional settlement process is used. However, if the validation module 1708 determines the signature does match the broker's private key, the affirmation module 1712 can flag or tag the trade, which indicates the trade has been verified and is eligible for the "fast track" settlement process.

Storage 1714 can be any device or mechanism used for storing information. Storage 1714 may be used to store instructions for running one or more applications or modules (e.g., encryption module 1706, validation module 1708) on processor(s) 1702. In some embodiments, the storage 1714 includes various cryptographic public and private keys used for validation, ledger records of transactions, audit log(s) of transactions for a particular broker or custodian, etc.

Figure 18:
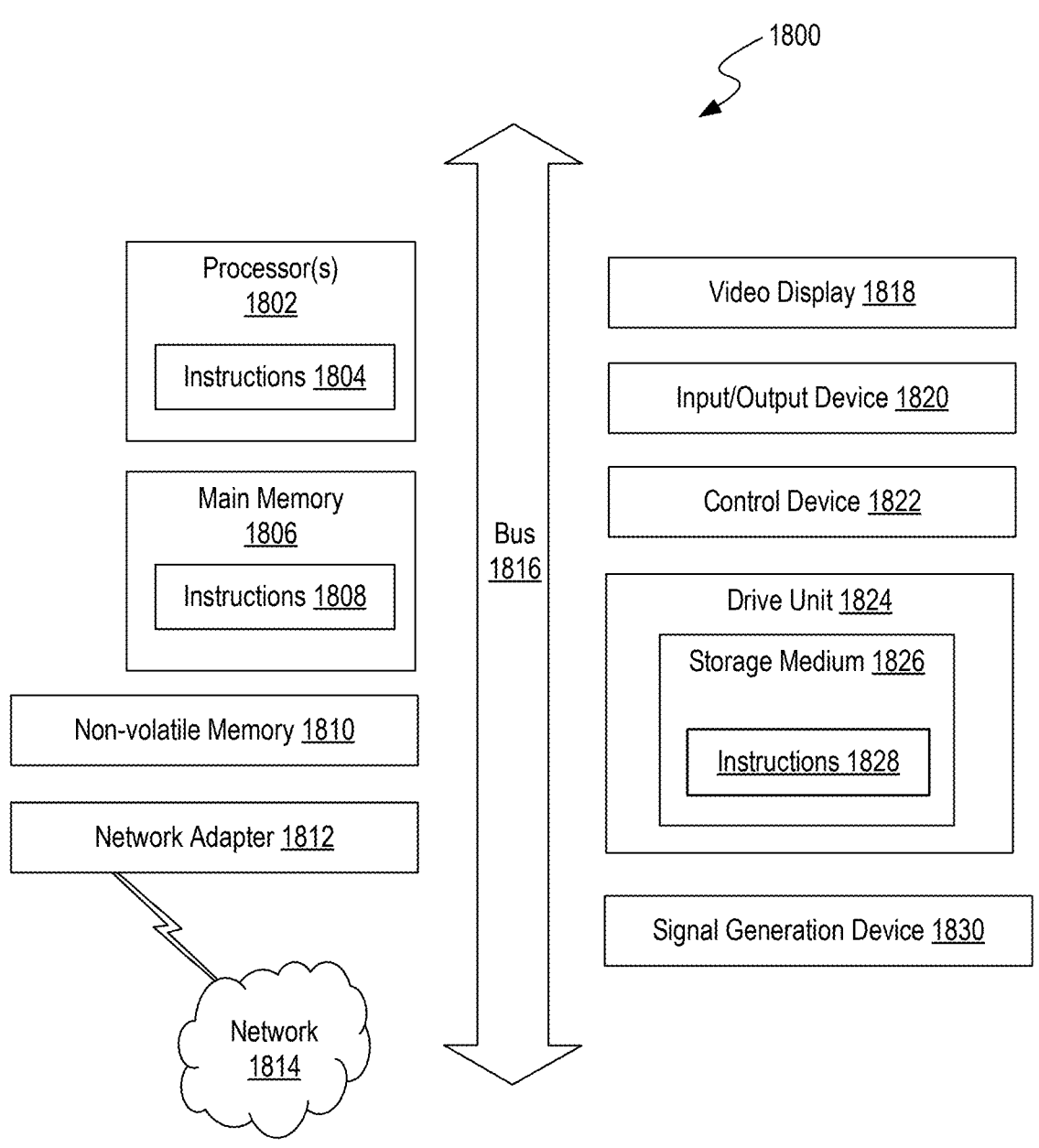
FIG. 18 is a block diagram illustrating an example of a computer system in which at least some operations described herein can be implemented according to various embodiments.

FIG. 18 is a block diagram illustrating an example of a computing system 1800 in which at least some operations described herein can be implemented. The computing system may include one or more central processing units ("processors") 1802, main memory 1806, non-volatile memory 1810, network adapter 1012 (e.g., network interfaces), video display 1818, input/output devices 1820, control device 1822 (e.g., keyboard and pointing devices), drive unit 1024 including a storage medium 1826, and signal generation device 1830 that are communicatively connected to a bus 1816. The bus 1816 is illustrated as an abstraction that represents any one or more separate physical buses, point to point connections, or both connected by appropriate bridges, adapters, or controllers. The bus 1816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 1800 operates as a standalone device, although the computing system 1800 may be connected (e.g., wired or wirelessly) to other machines. In a networked deployment, the computing system 1800 may operate in the capacity of a server or a client machine in a client-server network environment, or as a peer machine in a peer-to-peer (or distributed) network environment.

The computing system 1800 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1806, non-volatile memory 1810, and storage medium 1826 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1804, 1808, 1828) set at various times in various memory and storage devices in a computer, and that, when read and executed by one or more processing units or processors 1802, cause the computing system 1800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1810, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 1812 enables the computing system 1800 to mediate data in a network 1814 with an entity that is external to the computing device 1800, through any known and/or convenient communications protocol supported by the computing system 1800 and the external entity. The network adapter 1812 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 1812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

The techniques introduced herein can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 19:
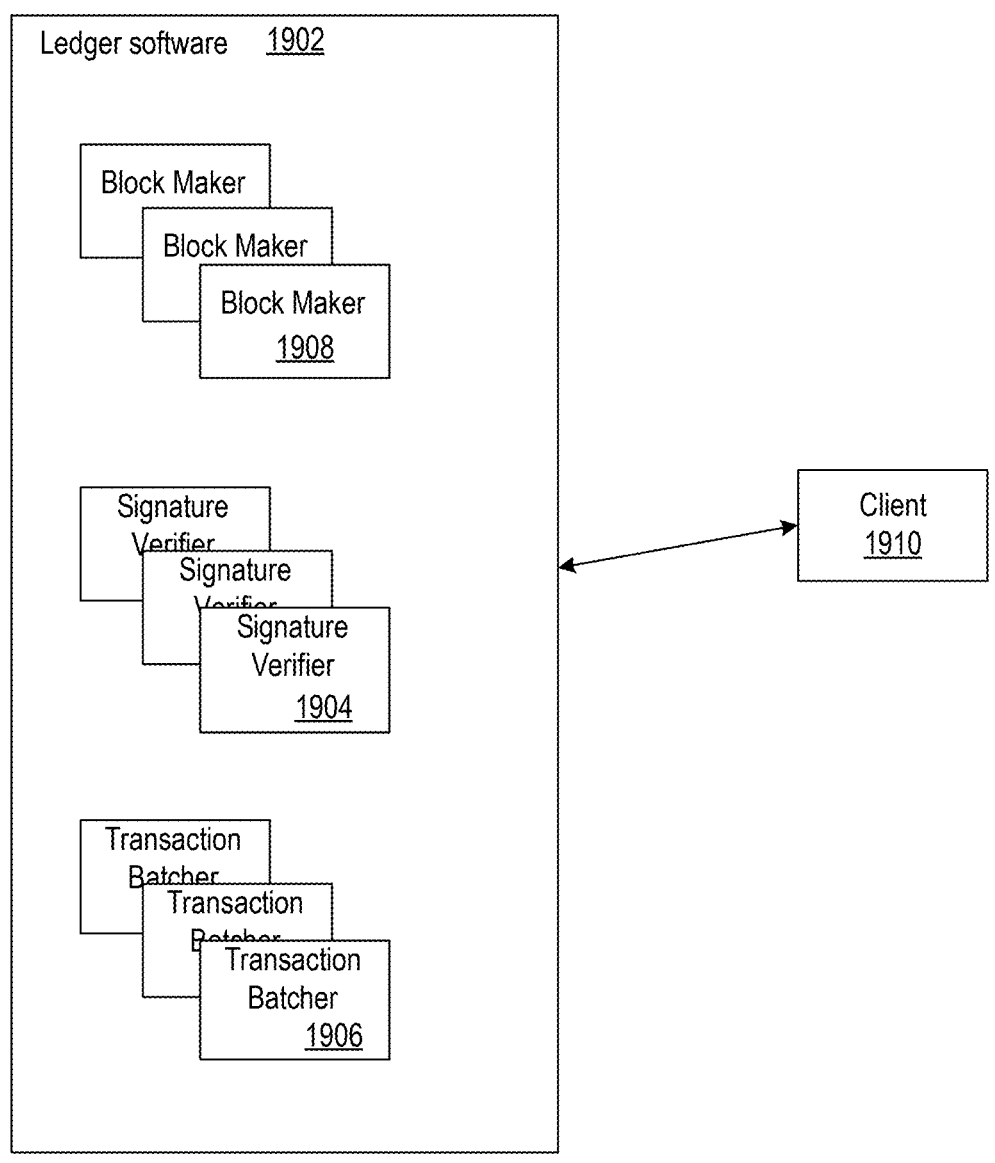
FIG. 19 is a block diagram of the system architecture of append-only ledger generation software.

FIG. 19 is a block diagram of the system architecture of append-only ledger generation software 1902. The ledger software 1902 uses a set of microservices to work together in an efficient, scalable architecture. At the time of filing, the Blockchain ledger of Bitcoin famously only processes seven transactions per second. Seven a second is not sufficient to handle the peak load of securities transactions. Unlike other Block Chains, such as the Bitcoin Blockchain, the ledger software 1902 does not include Proof of Work, Mining, Proof of Stake, or any form of Byzantine Fault Tolerance.

The ledger software 1902 and microservices therein operate on a plurality of computer systems and communicate with one another in a distributed computing fashion. The services are described below and include signature verifiers 1904, transaction batchers 1906, block makers 1908, which all serve clients 1910. A number of each microservice 1904-1908 is instanced as required by the scaled needs of the system and implemented on computer system hardware as appropriate. The comparative relation of the number of each microservice 1904-1908 to one another is non-fixed and is dependent on processing power specifications of the computer hardware each microservice 1904-1908 is instanced on. Clients 1910 generate transactions (abbreviated as "Tx" on figures) and communicate with the ledger software 1902.

Figure 20:
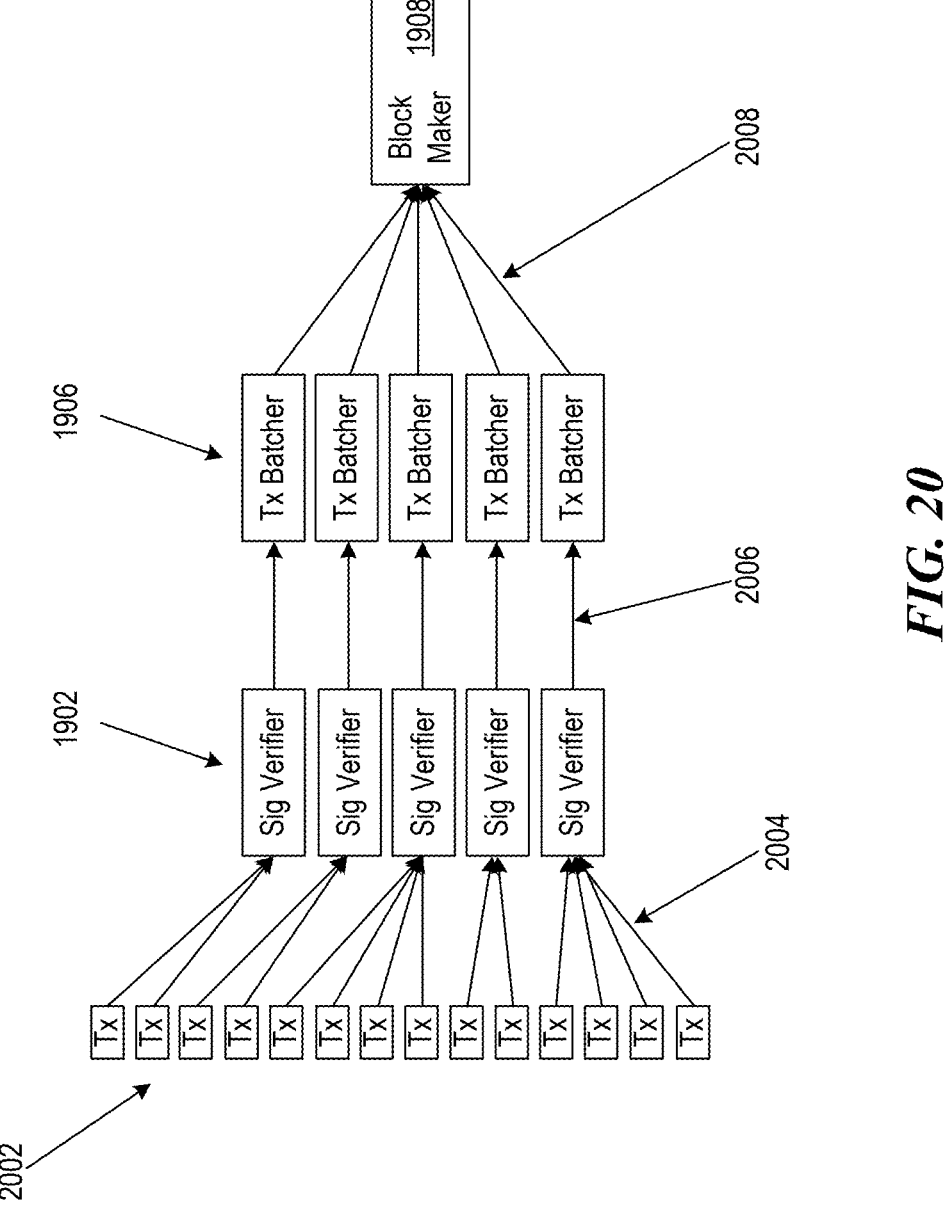
FIG. 20 is a block diagram of transaction batching.

FIG. 20 is a block diagram of transaction verification, batching and block generation. Verifying signatures on transactions 2002 is a computationally expensive process. However, the problem of verifying many signatures can be performed in parallel. meaning that the computational work is easily divided and there is no dependency or need for communication between signature verifiers 1902. Because signature verification is so expensive computationally, high speed signature systems are preferred. A public example of a high speed key signature system is Ed25519, though there are suitable cryptographic key systems known in the art.

A signature verification process 2004 receives a transaction messages 2002 each including a signature and public key as an input. If the signature does not match the public key in the transaction message mathematically through the chosen signature cryptography scheme, the signature verification process 2004 handles the input as an error. If the signature is verified, the signature verification process 2004 handles the input as verified, and passes it along to the next step. Verified cryptographically signed messages are passed to transaction batchers 1906.

Transaction batchers 1906 perform operations on batches of input before passing it to a block maker. Of note, batching operations 2006 are independent of variable signature verifiers 1904, thus the output of the signature verifiers 1906 are not dependent on one another. Examples of batching operation 2006 parameters include compressing transactions after every X transactions, or after every Y milliseconds have passed. A compressed group of transactions are passed on to a block maker 1908.

A block maker 1908 takes as input compressed batches of transactions with verified signatures. The block maker 1908 stores each input in a linked-list that represents the data of the current block being written. A block represents data written in a specific window of time. blocks must be written after the previous block, and before the subsequent block in a block chain.

In an illustrative example, a new block is created each second. The block maker 1908 uses a Key-Value Storage system, where the key is used to designate the block time window, and the value is the linked-list of compressed verified transaction data.

The block maker 1908 generates the Merkle Root of a block by running a cryptographic hash function on the data in the current block and the previous block's Merkle root. There is of course an exception to the block hashing for the first block posted on the append-only ledger. The first block cannot have a previous block's Merkle root because there is no previous block. In this case, an empty string can be used as the previous Merkle root, or any static value can also be used.

In order to accommodate a high transaction rate, ledger transactions are recorded using volatile, high speed, memory, such as RAM. Data persistence is achieved by flushing the in-memory working set of data to a permanent storage device periodically. To achieve these operations, "fsync" type methods can perform this operation once per second.

Figure 21:
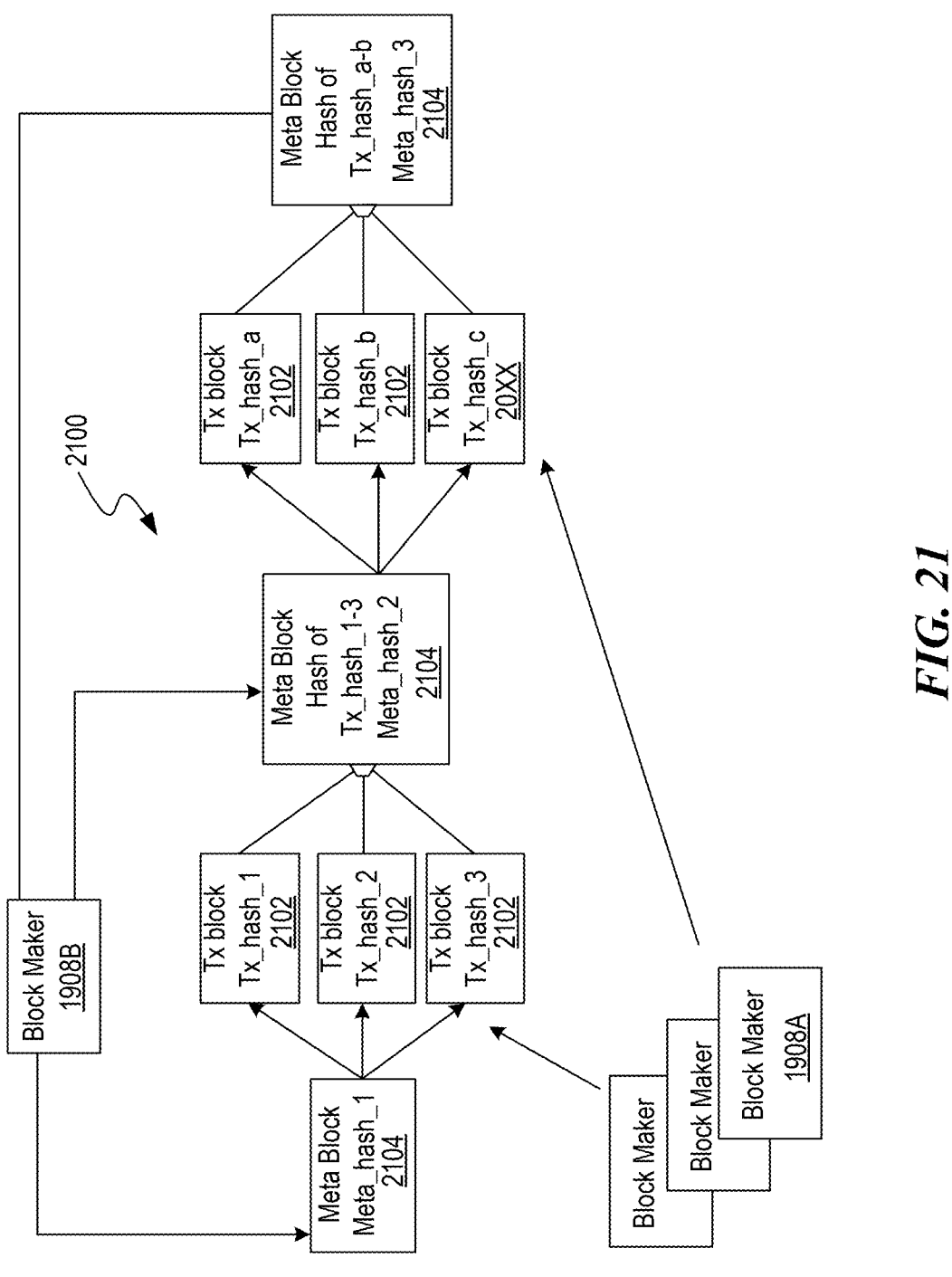
FIG. 21 is a block diagram of distributing additions to the append-only ledger.

FIG. 21 is a block diagram of distributing additions to the append-only ledger. In the displayed example, there are a plurality of block makers 1908 as well as the data structure 2100 for the append-only ledger. As a result that block makers 1908 process a hash function on a set of data including the hash of the previous block, block creation is difficult computational work to parallelize. As discussed above, data consistency over a large network is time intensive, and using a structure which plans eventual consistency of the data is more scalable.

In order to scale, the ledger data structure 2100 shards the total of incoming transactions into many blocks 2102. After transactions are sharded into blocks, a single, metadata block 2104 is created from just the hash of the transaction blocks. Because much less data is contained in the metadata block 2194, generation is faster than for the transaction blocks 2102.

In operation the block makers 1908 are split into 2 groups, those block makers 1908A generating transaction blocks 2102 and the relatively few block makers 1908B generating metadata blocks 2104. While the figure displays a 3 to 1 ratio, this is merely illustrative and the actual ratio depends on the hardware performance. In an arbitrary example, if the block makers 1908A process 1000 batched transactions a second, each including the Merkle root of the data for 1000 transactions and the hash of the previous block. Then the block maker 1908B obtains the Merkle root for the most recent set of transaction blocks 2102 in order to generate the metadata block 2104.

In a more specific illustrative example, a first metablock at an arbitrary point in the ledger has a hash value of "meta_hash_1." The plurality of transactions processed in the following second are processed by three block makers 1908A and have the Merkle root of the transaction data combined with meta_hash_1. The respective has values here are Tx_hash_1, Tx_hash_2, and Tx_hash_3.

After, the meta block maker 1908B generates a metadata block 2104 which includes the Merkle root of the 3 transaction block 2102 hashes (Tx_hash_1, Tx_hash_2, and Tx_hash_3). The new value is Meta_hash_2. Because there is significantly less data to be hashed in the creation of the metadata block 2104, this block is created significantly faster and additional time may elapse to allow for the block makers 1908A to complete each's respective transaction processing work. In this way distributed work dependency is limited to a single, or relatively few meta block makers 1908B, which is expected to complete work faster than the transaction block makers 1908A.

In the subsequent round of transactions, the three block makers 1908A generate the Merkle root of the second round of transaction data combined with meta_hash_2. The respective has values here are Tx_hash_a, Tx_hash_b, and Tx_hash_c. Those hash values are then used to generate Meta_hash_3.

In some embodiments, there are a number of append-only ledgers which are organized in tiers wherein each tier receives a certain percentage of the incoming transaction data where the highest tier receives all the transaction data and the lowest tier receives the smallest percentage of the incoming transaction data.

Figure 22:
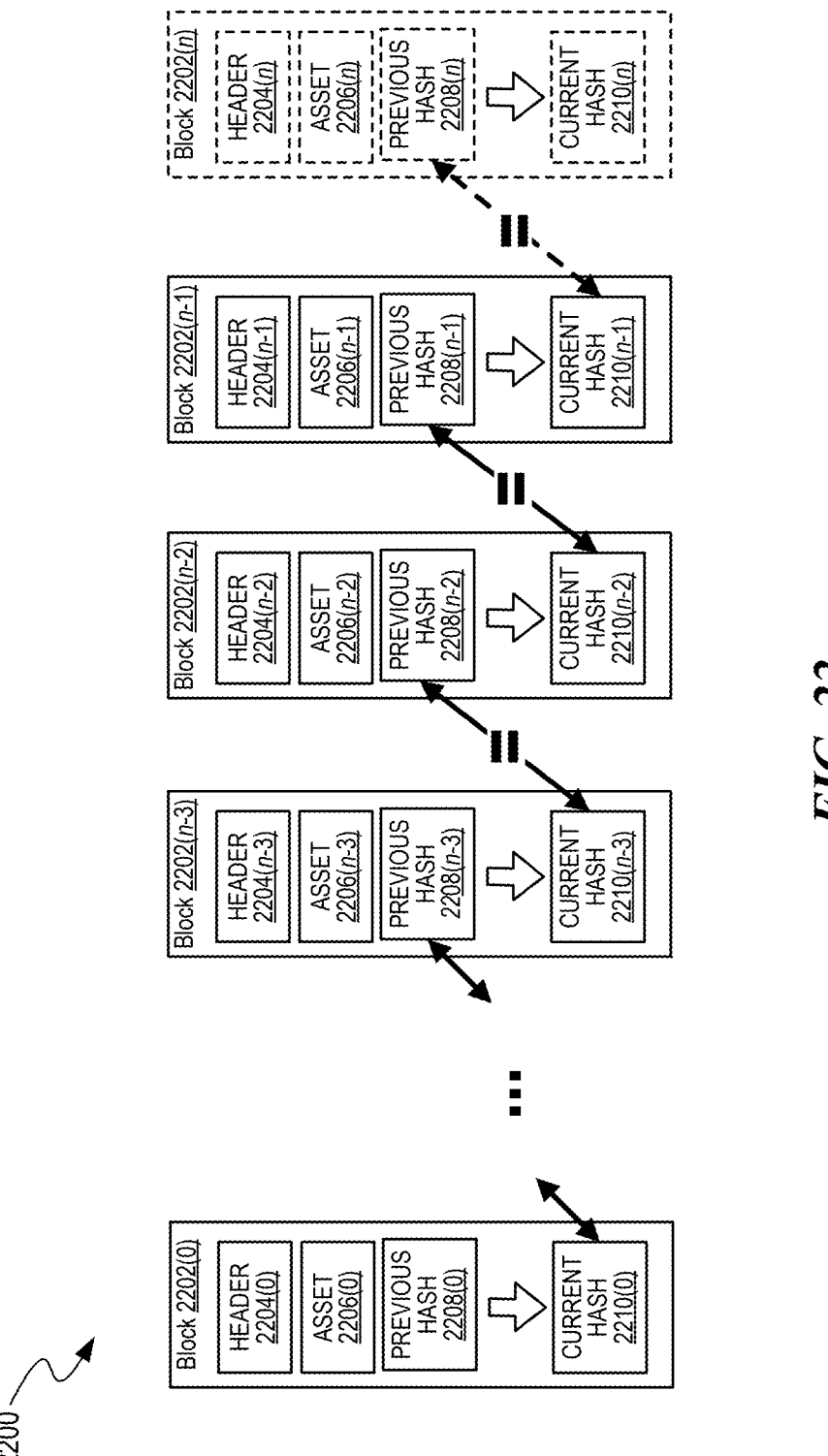
FIG. 22 shows a series of n blocks that are cryptographically linked to form a distributed ledger or blockchain.

FIG. 22 shows a series of n blocks 2202 that are cryptographically linked to form a distributed ledger or blockchain 2200. Each block 2202 stores header information 2204, an asset 2206, a previous hash value 2208, and a current hash value 2210. When cryptographically linked, the blocks 2202 form an ordered sequence in which each block is uniquely indexed. For clarity, each block 2202 is labeled with an index in parentheses that identities the position of that block 2202 in the blockchain 2200. For example, the ith block 2202 is labeled block 2202(i), and it stores similarly indexed header information 2204(i), asset 2206(i), previous hash value 2208(i), and current hash value 2210(i). As shown in FIG. 22, the blockchain 2200 begins with an origin block 2202(0). The number of blocks in the blockchain 2200 may be thousands, millions, or more. In FIG. 22, only the origin block 2202(0) and the four most recent blocks 2202(n−3), 2202(n−2), 2202(n−1), and 2202(n) are shown.

Identical copies of the blockchain 2200 may be stored on multiple computing nodes (or simply "nodes") that cooperate as a peer-to-peer distributed computing network to implement the blockchain 2200 as a type of distributed ledger. In this case, the nodes cooperate to add new blocks to the blockchain 2200 in a decentralized manner. Said another way, the nodes may cooperate to add new blocks to the blockchain 2200 without a central authority or trusted third party.

A consensus protocol may be implemented by the nodes to validate data to be appended to the blockchain 2200. Once data is validated by a node, the node may broadcast the validated data to all other nodes, which then update their local copies of the blockchain 2200 by appending the validated data to the blockchain 2200 as a new block. Validation may be implemented via proof of work (POW), POS, POA, or another type of consensus protocol. Once a block 2202 is added to the blockchain 2200, it can only be modified via collusion of a majority of the nodes (i.e., a 51 percent attack). Such collusion is highly unlikely—especially for private blockchains—so blockchains are considered secure by design.

Fundamentally, the blockchain 2200 may be similar in some respects to those implemented for cryptocurrencies, such as Bitcoin and Ethereum, that process and then store data related to financial transaction. However, the blockchain 2200 (and, more specifically, the asset 2206 in each block 2202) may be able to store any type of data. For example, the asset 2206 may include protected health information ("PHI") or personal identifiable information ("PII") that are encrypted. Generally, PHI includes any information about the health status (also referred to as the "health state") of a person, healthcare products and services provisioned to the person, or payments made for healthcare products and services. This information may be generally referred to as "medical data." For medical data to be considered PHI, it must include at least one identifying piece of information. Thus, PHI includes medical data and PII. Examples of PII include name, social security number, and date of birth. In some embodiments the asset 2206 is fully unencrypted, while in other embodiments the asset 2206 is fully encrypted. Alternatively, the asset 2206 may be partially unencrypted and partially encrypted. Advantageously, data that is stored in the blockchain 2200 may essentially be immutable, and thus can be readily verified during an audit.

While not shown in FIG. 22, the blockchain 2200 may have a unique name or identifier that allows it to be uniquely identified from amongst other blockchains that are stored, implemented, or managed by the same computational architecture. Thus, the blockchain 2200 may not be the only one accessible to the computational architecture.

FIG. 22 also illustrates how when a new block 2202 ($n$) is added to the blockchain 2200, it can be cryptographically linked to the previous block 2202 (n–1). The current hash value 2210 (n–1) of the previous block 2202 (n–1) is copied and then stored as the previous hash value 2208 ($n$) of the new block 2202 ($n$). Thus, the current hash value 2210 (n–1) equals the previous hash value 2208 ($n$). The current hash value 2210 ($n$) can then be determined by hashing the header information 2204 ($n$), asset 2206 ($n$), and previous hash value 2208 ($n$) stored in the new block 2202 ($n$). For example, the header information 2204 ($n$), asset 2206 ($n$), and previous hash value 2208 ($n$) may be concatenated into a single string that is input into a cryptographic hash function (or simply "hash function") whose output is stored as the current hash value 2210 ($n$). Alternatively, the header information 2204 ($n$), asset 2206 ($n$), and previous hash value 2208 ($n$) may be pair-wise hashed into a Merkle tree whose root node is stored as the current hash value 2210 ($n$). Other ways of using the hash function to generate the current hash value 2210 ($n$) may be employed without departing from the principles of the present disclosure. Each hash value may be representative of a cryptographically calculated value of fixed length. While the hash values are not guaranteed to be unique across all data, it is usually very hard to duplicate so hash values are valuable in identifying blocks within the blockchain.

The current hash values 2210 provide an efficient way to identify changes to any data stored in any block 2202, thereby ensuring both the integrity of the data stored in the blockchain 2200 and the order of the blocks 2202 in the blockchain 2200. To appreciate how the current hash values 2210 enforce data integrity and block order, consider a change made to one or more of the header information 2204($i$), asset 2206($i$), and previous hash value 2208($i$) of the block 2202($i$), where i is any integer between 1 and n. The change may be detected by rehashing the block 2202($i$) and comparing the result with the current hash value 2210($i$) stored in the block 2202($i$). Additionally or alternatively, the rehash value may be compared to the previous hash value 2208 (i+1) that is stored in the subsequent block 2202 (i+1). Due to the change, the rehash value will not equal the current hash value 2210($i$) and the previous hash value 2208 (i+1). These unequal hash values can be used to identify an attempt to alter the block 2202($i$). Assuming no entity controls a majority of the voting power (i.e., there is no collusion), such attempts to modify data in the blockchain 2200 will be rejected due to the consensus protocols described above.

The blockchain 2200 may be verified via two steps. First, for each block 2202($i$), a recomputed hash of the header information 2204($i$), asset 2206($i$), and previous hash value 2208($i$) may be compared to the current hash value 2210($i$) to ensure that the rehash value equals the current hash value 2210($i$). This first step authenticates the data stored within each block 2202. Second, for each block 2202($i$), the previous hash value 2208($i$) may be compared to the current hash value 2210 (i–1) of the previous block 2202 (i–1) to ensure that these values are equal. This second step authenticates the order of the blocks 2202. Verification of the blockchain 2200 may proceed "backwards." Said another way, the blockchain 2200 can be verified by sequentially verifying each block 2202 starting from the most recent block 2202 ($n$) and ending at the origin block 2202(0). Alternatively, verification may proceed "forwards" by sequentially verifying each block 2202 starting from the origin block 2202(0) and ending with the most recent block 2202 ($n$). Validation may occur periodically (e.g., once per hour, day, or week), in response to a predetermined number of new blocks being added to the blockchain 2200, or in accordance with a different schedule or triggering event. For the origin block 2202(0), the previous hash value 2208(0) may be set to an arbitrarily chosen value.

In FIG. 22, each block 2202($i$) is shown storing its current hash value 2210($i$). However, it is not necessary for each block 2202($i$) to store its current hash value 2210($i$) since it can always be generated by hashing the other data stored in the block 2202($i$). Nevertheless, storing the current hash value 2210($i$) in each block 2202($i$) can greatly speed up retrieval of the blocks 2202, and thus access to the asset 2206, by using the current hash values 2210 as search keys in a database index. For example, each current hash value 2210($i$) may be represented as a node in a binary search tree (e.g., a B-tree, self-balancing binary search tree, or fractal tree index). Each node may also store the corresponding index i. When a new block 2202 ($n$) is added to the blockchain 2200, its owner (e.g., as indicated by the owner ID 216 of FIG. 2) may be given the resulting current hash value 2210 ($n$) as a confirmation. When the owner wishes to subsequently retrieve the corresponding asset 2206 ($n$) from the blockchain 2200, the owner may submit a request that contains an indication of the confirmation (e.g., the current hash value 2210 ($n$) that serves as a unique identifier). The binary search tree can be searched to quickly find the index n. The block 2202 (*n*) may then be directly accessed without having to sequentially search the blocks 2202. As an additional check, the receipt may be compared to the current hash value 2210 (*n*) of the retrieved block 2202 (*n*) to ensure the values match.

FIG. 23 is a flow diagram illustrating a process for distributed cryptographic consensus-based state synchronization. In some implementations, the process is performed by a computing system, e.g., example computing system 1800 illustrated and described in more detail with reference to FIG. 18. Particular entities, for example, nodes of a distributed ledger (such as blockchain 2200 illustrated and described in more detail with reference to FIG. 22) perform some or all of the steps of the process in other implementations. Likewise, implementations can include different and/or additional steps or can perform the steps in different orders.

At 2304, a computing system irrevocably performs a first transfer of at least one digital security position or tokenized security from a first digital instrument container (or token wallet) of a distributed ledger to a second digital instrument container of the distributed ledger. In some implementations, the distributed ledger is a private permissioned ledger. As used herein, a private permissioned ledger may refer to a distributed database system where access and ability to validate transactions are restricted to a predefined set of authorized participants, enhancing security and control.

The digital synchronization agent, operating within the distributed ledger, executes the transfer by cryptographically authenticating the transaction using the private key associated with the first digital instrument container. The transfer operation can be processed using a deterministic supervisory verification framework, which redundantly executes verification using a quorum of nodes to distribute trust and eliminate single points of failure. The system appends a priority timestamp to the transfer based on consensus among known participants, without utilizing mining, proof-of-work, or probabilistic finality mechanisms. As used herein, a probabilistic finality mechanism may refer to a consensus approach in distributed ledgers where transaction confirmation becomes increasingly certain over time, but absolute finality is never guaranteed with 100% certainty.

This creates an immutable, low-latency execution path for the transfer. The digital security position, represented as a cryptographically-secured data structure, is atomically moved between the digital instrument containers, adhering to programmatically enforced rules governing its transfer within the system's consensus protocol. The transfer's finality is immutably recorded across the distributed ledger, ensuring an auditable and irreversible transaction. As used herein, finality refers to the state in a distributed ledger system where a transaction is considered irreversible and permanently recorded, with no possibility of being altered or removed from the ledger.

At 2308, the computing system irrevocably performs a second transfer of at least one digital fiat instrument corresponding to the at least one digital security position from the second digital instrument container to the first digital instrument container, wherein the second transfer is performed synchronously with the first transfer. The digital reconciliation agent executes this transfer simultaneously with the first transfer, ensuring atomic execution of the delivery-versus-payment (DvP) transaction. Atomic DvP settlement refers to the simultaneous state synchronization of tokenized securities and tokenized instruments, ensuring both asset and payment transfers complete together without counterparty risk. As used herein, DvP finality may refer to the simultaneous and irrevocable transfer of securities and corresponding payment, ensuring that delivery occurs if and only if the associated payment is made, eliminating settlement risk.

The digital fiat instrument can be implemented as a smart contract with predefined transfer rules, is cryptographically moved between the digital instrument containers. This process leverages the deterministic supervisory verification framework, which redundantly verifies the transfer using a quorum of nodes in the distributed ledger. A priority timestamp is appended to the transfer based on consensus, creating an immutable execution path with sub-threshold latency. The system's worker/supervisor model acts as a deterministic and auditable trust layer, distributing verification across multiple nodes. This synchronous transfer eliminates deferred reconciliation, providing real-time gross settlement (RTGS) with simultaneous final delivery of securities and cash, thereby reducing settlement risk and operational complexity.

The computing system can expose at least one application programming interface (API) to ingest a request from a tokenized state synchronization platform for performing the first transfer and the second transfer. This API serves as a standardized interface, enabling interoperability between the distributed ledger system and external tokenized settlement platforms. The API is designed to accept cryptographically signed instructions that include settlement FIX tags, which are short hashes of 30-50 characters that link to more detailed settlement instructions. When a request is received through the API, the system's digital reconciliation agent validates the cryptographic signatures and matches the settlement FIX tags with the corresponding full settlement instructions stored within the system. This process allows for efficient ingestion of transfer requests while maintaining the security and integrity of the transaction data. The API also supports the ingestion of state synchronization messages from fiat clearing platforms, facilitating seamless integration with existing financial infrastructure. By exposing these APIs, the system enables straight-through-processing (STP) and real-time gross settlement (RTGS) capabilities, supporting interoperability with various settlement platforms, including fiat clearing networks, tokenized systems, and real-time payment infrastructures such as Fed-Now, CHIPS, RTP, SWIFT, or card-based token rails.

At 2312, the computing system synchronizes a state of the at least one digital security position with a state of the at least one digital fiat instrument in real time with the first transfer and the second transfer to prevent deferred synchronization of the state of the digital security position with the state of the digital fiat instrument. The digital reconciliation agent, operating within the distributed ledger, ensures that the cryptographically-secured data structures representing both the digital security position and the digital fiat instrument are updated simultaneously across all relevant nodes. This synchronization process leverages the system's hierarchical ledger structure, propagating state changes through primary, secondary, and tertiary ledgers. The deterministic consensus protocol, which excludes energy-intensive mining operations and probabilistic finality models, enables rapid state updates across the network.

The deterministic consensus protocol is a distributed agreement mechanism that ensures all nodes in a network reach the same decision in a predictable manner. It operates on a fixed set of known participants, typically in a private permissioned ledger. The protocol uses a predefined algorithm to order transactions and achieve agreement without relying on probabilistic methods. It may employ techniques such as leader election, round-robin validation, or Byzantine fault-tolerant voting. This approach enables faster finality, lower latency, and higher throughput compared to probabilistic consensus mechanisms, as it eliminates the need for multiple confirmations or extended waiting periods to achieve settlement finality. By maintaining real-time consistency between the digital security position and digital fiat instrument states, the system eliminates the need for post-trade reconciliation processes. This approach significantly reduces operational risk, enhances transparency, and supports the system's function as a regulated digital settlement agent, providing synchronous, irrevocable DvP finality over the distributed ledger.

The computing system can expose at least one application programming interface (API) to ingest a state synchronization message from a fiat clearing platform for performing the first transfer and the second transfer. This API is designed to facilitate seamless integration with existing fiat clearing networks, enabling the system to function as a regulated digital settlement agent within the broader financial ecosystem. When a state synchronization message is received through the API, the digital reconciliation agent within the distributed ledger processes the message, extracting relevant information for the transfers. The message may contain cryptographically signed instructions, including settlement FIX tags, which are validated against the system's security protocols. The API supports the ingestion of standardized message formats used in fiat clearing platforms, ensuring compatibility with established financial messaging systems. Upon successful validation, the system translates the fiat clearing platform's state synchronization message into corresponding operations within the private permissioned ledger, initiating the synchronous transfer of digital security positions and digital fiat instruments between the appropriate digital instrument containers. This integration allows the system to provide real-time gross settlement (RTGS) capabilities that bridge traditional fiat clearing processes with the efficiency and security of distributed ledger technology, supporting interoperability across diverse settlement platforms and payment systems.

At 2316, the computing system immutably records finality of the first transfer and the second transfer across the private permissioned ledger. The digital reconciliation agent appends a new block to the distributed ledger, containing cryptographically-linked transaction data for both transfers. This block includes a unique hash value derived from the transaction details and the previous block's hash, ensuring an unbroken chain of cryptographic integrity. The system utilizes a deterministic consensus protocol to validate and append this block, distributing the verification process across a quorum of trusted nodes. A priority timestamp is cryptographically sealed within the block, establishing an immutable execution path with sub-threshold latency. The hierarchical ledger structure propagates this finality record through primary, secondary, and tertiary ledgers, ensuring consistency across all relevant nodes. This immutable record serves as a cryptographically-authenticated proof of settlement, supporting regulatory compliance and enabling real-time audits. The system's approach eliminates the need for traditional multi-day settlement cycles, providing instant, verifiable finality for digital security position and digital fiat instrument transfers.

FIG. 24 is a flow diagram illustrating a process for operating a deterministic supervisory verification framework using redundant verification and deterministic validators. In some implementations, the process is performed by a computing system, e.g., example computing system 1800 illustrated and described in more detail with reference to FIG. 18. Particular entities, for example, nodes of a distributed ledger (such as blockchain 2200 illustrated and described in more detail with reference to FIG. 22) perform some or all of the steps of the process in other implementations. Likewise, implementations can include different and/or additional steps or can perform the steps in different orders.

At 2404, a computing system receives a request for a transfer operation involving at least one digital security position and at least one digital fiat instrument. The request is ingested through an exposed application programming interface (API) designed to accept cryptographically signed instructions from tokenized state synchronization platforms or fiat clearing networks. The request includes settlement FIX tags, which are short hashes linking to more detailed settlement instructions stored within the system. The digital reconciliation agent, operating within the distributed ledger, processes this request by validating the cryptographic signatures and matching the settlement FIX tags with corresponding full instructions. The system interprets the request as an instruction to perform a synchronous, atomic transfer of the specified digital security position and its corresponding digital fiat instrument between designated digital instrument containers. This process initiates the system's deterministic supervisory verification framework, preparing the transfer operation for redundant execution across a quorum of nodes in the distributed ledger environment.

At 2408, the computing system redundantly executes verification of the request across a quorum of the plurality of nodes. The deterministic supervisory verification framework distributes trust by employing multiple nodes to independently verify the transfer operation request. This approach eliminates single points of failure within the distributed ledger architecture. The worker/supervisor model acts as a deterministic and auditable trust layer, with supervisors coordinating the allocation of verification tasks to worker processes. Each node in the quorum performs signature verification on the cryptographically signed instructions accompanying the request. The verified results are then immutably recorded on the distributed ledger. This redundant execution enhances the system's fault tolerance and security, as consensus among the quorum of nodes is required to validate the request. By implementing this distributed verification process, the system improves the functioning of the distributed ledger by ensuring the integrity and authenticity of transfer operations while maintaining high throughput and low latency in real-time gross settlement scenarios.

As used herein, redundant verification refers to concurrent execution of deterministic validation logic by multiple distributed nodes, ensuring consensus-based integrity, fault tolerance, and cryptographic assurance of digital state transitions in a ledgered system. For example, redundant verification can be performed by distributing a transfer request (including cryptographically signed clearing and asset transfer instructions) to a quorum of nodes operating within a deterministic supervisory verification framework. Each node independently executes a deterministic validation process to confirm the authenticity of the digital signatures and the eligibility of the transaction for fast-track settlement. Only authorized parties with valid cryptographic credentials can initiate transfers. By replicating the validation across multiple nodes, the system eliminates single points of failure and enforces cryptographic consistency. The nodes compare their verification outcomes, and upon achieving consensus, append the transaction to the append-only primary ledger with a priority timestamp.

As used herein, deterministic validators refer to network nodes that execute predefined, non-probabilistic validation logic to consistently verify transactions, enabling consensus and eliminating ambiguity in distributed ledger state synchronization processes. For example, deterministic validators execute predefined, non-probabilistic logic to validate digital instrument transfer instructions within the distributed cryptographic consensus-based architecture. Each validator independently analyzes cryptographically signed order data using identical verification algorithms to determine transaction authenticity and eligibility for real-time gross settlement. Because the validators execute the same deterministic functions, they produce consistent results across the network without relying on probabilistic consensus mechanisms. The validated transaction is appended to the primary ledger with a priority timestamp, ensuring immutability, traceability, and synchronized state transitions across ledger tiers.

At 2412, the computing system immutably records results of the verification on the private permissioned ledger, wherein said execution distributes trust across the quorum of the plurality of nodes to prevent single points of failure. The system utilizes a cryptographic append-only data structure to store the verification results, ensuring that once recorded, the data cannot be altered or deleted. Each node in the quorum independently logs the verification outcome, creating a distributed and redundant record. The worker/supervisor model coordinates this process, with supervisors ensuring proper allocation of recording tasks to worker processes. The immutable recording leverages cryptographic hash functions to link each new entry to previous ones, forming a chain of verifiable data blocks. This approach enhances the distributed ledger's integrity and fault tolerance by eliminating reliance on a single authoritative record. By distributing trust and creating an auditable, tamper-resistant verification log, the system improves the overall security and reliability of the private permissioned ledger, supporting regulated audit requirements and enabling real-time gross settlement with cryptographic certainty.

At 2416, the computing system appends a priority timestamp to the transfer operation based on consensus among the plurality of nodes, wherein the priority timestamp provides an immutable execution path for the transfer operation, and wherein the execution path is associated with a latency less than a threshold latency. The system utilizes a deterministic consensus protocol that excludes mining operations, proof-of-work mechanisms, and probabilistic finality models to generate the priority timestamp. This approach enables the system to create an immutable, low-latency execution path for the transfer operation. The consensus mechanism distributes the timestamp generation across the quorum of nodes, ensuring agreement on the temporal ordering of transactions. By appending this consensus-derived timestamp, the system establishes a verifiable and tamper-resistant record of the transfer operation's execution sequence. This process enhances the distributed ledger's functionality by providing a cryptographically secure method for ordering transactions, enabling real-time gross settlement with simultaneous final delivery of digital security positions and digital fiat instruments, and supporting auditable transaction histories with sub-threshold latency.

The priority timestamp is generated using a deterministic consensus protocol implemented across the plurality of nodes in the private permissioned ledger. This protocol operates without relying on mining operations, proof-of-work mechanisms, or probabilistic finality models typically associated with public blockchain networks. Instead, the system employs a worker/supervisor architecture where supervisors coordinate the consensus process among known, authorized participants. The worker processes execute the timestamp generation in parallel, with each node independently proposing a timestamp based on its local clock. The supervisors then aggregate these proposals and determine the final priority timestamp through a predetermined algorithm, such as selecting the median value or using a Byzantine fault-tolerant voting mechanism.

By excluding energy-intensive mining and proof-of-work operations, the system significantly reduces computational overhead and energy consumption. This approach allows for faster consensus achievement and lower latency in timestamp generation. The absence of probabilistic finality mechanisms further enhances the system's efficiency, as the consensus reached is deterministic and final without requiring multiple confirmations or extended waiting periods.

The resulting priority timestamp, agreed upon by the quorum of nodes, is cryptographically linked to the transfer operation, creating an immutable execution path. This path provides a verifiable and tamper-resistant record of the transaction's temporal ordering within the ledger. The deterministic nature of the consensus protocol, combined with the efficient worker/supervisor model, enables the system to consistently generate and append timestamps with latency below the specified threshold.

Latency, as used herein, refers to the time delay between initiating a transfer operation and its completion within the distributed ledger system. Threshold latency represents the maximum acceptable time delay for executing these transfers, typically defined to meet real-time or near real-time settlement requirements. The computing system maintains transfer latency below this threshold to provide more efficient and timely state synchronization of digital security positions and digital fiat instruments. Examples of threshold latency may include sub-second latency (e.g., 500 milliseconds) for high-frequency trading environments, 1-3 seconds for payment-settlement systems, and 5-10 seconds for cross-border transactions. The transfer latency is maintained below these thresholds through the various improvements described herein, such as the use of a deterministic consensus protocol, efficient signature verification processes, and the worker/supervisor model for distributed verification. By eliminating energy-intensive mining operations and probabilistic finality models, the system can achieve lower latencies compared to traditional blockchain implementations, ensuring transfers are executed and finalized within the specified threshold latency.

The disclosed approaches improve the functioning of the distributed ledger by enabling real-time gross settlement with simultaneous final delivery of digital security positions and digital fiat instruments. The approaches support higher transaction throughput while maintaining cryptographic certainty and auditability. The low-latency, immutable execution path facilitates rapid state synchronization, reducing counterparty risk and operational complexity.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

I claim:

1. A computer-implemented system for cryptographically authenticated state synchronization within a distributed ledger, the computer-implemented system comprising:
   one or more computer processors; and
   a non-transitory computer-readable storage medium storing computer instructions, which, when executed by the one or more computer processors, cause the computer-implemented system to:
      irrevocably perform a first transfer of at least one digital security position from a first digital instrument container of the distributed ledger to a second digital instrument container of the distributed ledger, wherein the distributed ledger has a hierarchical structure comprising primary, secondary, and tertiary ledgers;
      irrevocably perform a second transfer of at least one digital fiat instrument corresponding to the at least one digital security position from the second digital instrument container to the first digital instrument container, wherein the second transfer is performed synchronously with the first transfer, wherein the first transfer and the second transfer are performed simultaneously and atomically to provide atomic delivery-versus-payment settlement;
synchronize a state of the at least one digital security position with a state of the at least one digital fiat instrument in real time with the first transfer and the second transfer to prevent deferred synchronization of the state of the at least one digital security position with the state of the at least one digital fiat instrument,
   wherein synchronizing the state provides real-time gross settlement with simultaneous final transfer of the at least one digital security position and the at least one digital fiat instrument to prevent the deferred synchronization, and
   wherein synchronizing the state comprises propagating state changes associated with the first transfer and the second transfer through the primary, secondary, and tertiary ledgers; and
immutably record finality of the first transfer and the second transfer across the distributed ledger,
   wherein immutably recording the finality comprises propagating a finality record associated with the first transfer and the second transfer through the primary, secondary, and tertiary ledgers.

2. The computer-implemented system of claim 1, wherein the one or more computer processors are configured to:
   expose at least one application programming interface to ingest a request from a tokenized state synchronization platform for performing the first transfer and the second transfer.

3. The computer-implemented system of claim 1, wherein the one or more computer processors are configured to:
   expose at least one application programming interface to ingest a state synchronization message from a fiat clearing platform for performing the first transfer and the second transfer.

4. The computer-implemented system of claim 1,
   wherein the distributed ledger comprises a plurality of nodes, and
   wherein the one or more computer processors are configured to:
      receive a request for performing the first transfer and the second transfer; and
      redundantly execute verification of the request using a quorum of the plurality of nodes,
         wherein said verification distributes trust across the quorum of the plurality of nodes to prevent single points of failure within the distributed ledger.

5. The computer-implemented system of claim 1, wherein the one or more computer processors are configured to:
   generate a priority timestamp for the first transfer and the second transfer using a deterministic consensus protocol.

6. The computer-implemented system of claim 1, wherein the one or more computer processors are configured to:
   generate a priority timestamp for the first transfer and the second transfer,
      wherein the priority timestamp is associated with an immutable execution path for the first transfer and the second transfer.

7. The computer-implemented system of claim 1, wherein the first transfer and the second transfer are associated with a latency less than a threshold latency.

8. A computer-implemented system comprising:
   one or more computer processors configured to operate a deterministic supervisory verification framework within a distributed ledger comprising a plurality of communicatively coupled nodes, wherein the deterministic supervisory verification framework is configured to:

receive a request for a transfer operation involving at least one digital security position and at least one digital fiat instrument, redundantly execute verification of the request using a quorum of a plurality of nodes, wherein said verification distributes trust across the quorum of the plurality of nodes to prevent single points of failure within the distributed ledger, and wherein the distributed ledger has a hierarchical structure comprising primary, secondary, and tertiary ledgers;

immutably record results of the verification on the distributed ledger, wherein immutably recording the verification comprises propagating a finality record associated with the transfer operation through the primary, secondary, and tertiary ledgers; and append a priority timestamp to the transfer operation based on consensus among the plurality of nodes, wherein the priority timestamp is associated with an immutable execution path for the transfer operation, and wherein the immutable execution path is associated with a latency less than a threshold latency.

9. The computer-implemented system of claim 8, wherein the priority timestamp is generated using a deterministic consensus protocol that excludes mining operations.

10. The computer-implemented system of claim 8, wherein the priority timestamp is generated using a deterministic consensus protocol that excludes proof-of-work operations.

11. The computer-implemented system of claim 8, wherein the priority timestamp is generated using a deterministic consensus protocol that excludes a probabilistic finality mechanism.

12. The computer-implemented system of claim 8, wherein the transfer operation comprises steps to:

irrevocably move the at least one digital security position from a first digital instrument container of the distributed ledger to a second digital instrument container of the distributed ledger; and irrevocably move the at least one digital fiat instrument from the second digital instrument container to the first digital instrument container, wherein the at least one digital security position and the at least one digital fiat instrument are moved synchronously.

13. The computer-implemented system of claim 8, wherein the one or more computer processors are configured to:

synchronize a state of the at least one digital security position with a state of the at least one digital fiat instrument in real time with the transfer operation.

14. The computer-implemented system of claim 8, wherein the priority timestamp is based on consensus among the plurality of nodes, wherein the consensus among the plurality of nodes excludes mining operations, proof-of-work operations, and a probabilistic finality mechanism, and wherein the consensus among the plurality of nodes provides the immutable execution path that is associated with less than the threshold latency.

15. A computer-implemented method comprising:

receiving a request for a transfer operation involving at least one digital security position and at least one digital fiat instrument using a distributed ledger comprising a plurality of communicatively coupled nodes;

redundantly verifying the request using a quorum of a plurality of nodes, wherein said verifying distributes trust across the quorum of the plurality of nodes to prevent single points of failure, and wherein the distributed ledger has a hierarchical structure comprising primary, secondary, and tertiary ledgers;

immutably recording results of the verifying on the distributed ledger, including propagating a finality record associated with the transfer operation through the primary, secondary, and tertiary ledgers; and appending a priority timestamp to the transfer operation based on consensus among the plurality of nodes, wherein the priority timestamp is associated with an immutable execution path for the transfer operation, and wherein the immutable execution path is associated with a latency less than a threshold latency.

16. The computer-implemented method of claim 15, comprising:

generating the priority timestamp using a deterministic consensus protocol that excludes mining operations.

17. The computer-implemented method of claim 15, comprising:

generating the priority timestamp using a deterministic consensus protocol that excludes proof-of-work operations.

18. The computer-implemented method of claim 15, comprising:

generating the priority timestamp using a deterministic consensus protocol that excludes a probabilistic finality mechanism.

19. The computer-implemented method of claim 15, wherein the transfer operation comprises:

irrevocably moving the at least one digital security position from a first digital instrument container of the distributed ledger to a second digital instrument container of the distributed ledger; and irrevocably moving the at least one digital fiat instrument from the second digital instrument container to the first digital instrument container, wherein the at least one digital security position and the at least one digital fiat instrument are moved synchronously.

20. The computer-implemented method of claim 15, wherein the priority timestamp is based on consensus among the plurality of nodes, and wherein the consensus among the plurality of nodes provides the immutable execution path that is associated with less than the threshold latency.

\* \* \* \* \*